United States Patent
Kazmi et al.

(10) Patent No.: US 10,212,659 B2
(45) Date of Patent: Feb. 19, 2019

(54) SYSTEMS AND METHODS FOR OPERATION UNDER MULTI-LEVEL DISCONTINUOUS ACTIVITY CONFIGURATION

(71) Applicant: Telefonaktiebolaget LM Ericsson (publ), Stockholm (SE)

(72) Inventors: Muhammad Kazmi, Bromma (SE); Iana Siomina, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 226 days.

(21) Appl. No.: 15/122,877

(22) PCT Filed: Jun. 28, 2016

(86) PCT No.: PCT/SE2016/050643
§ 371 (c)(1),
(2) Date: Aug. 31, 2016

(87) PCT Pub. No.: WO2017/061919
PCT Pub. Date: Apr. 13, 2017

(65) Prior Publication Data
US 2017/0273022 A1    Sep. 21, 2017

Related U.S. Application Data
(60) Provisional application No. 62/237,341, filed on Oct. 5, 2015.

(51) Int. Cl.
*G08C 17/00*    (2006.01)
*H04W 52/02*    (2009.01)
(Continued)

(52) U.S. Cl.
CPC ....... *H04W 52/0216* (2013.01); *H04W 68/02* (2013.01); *H04W 72/0446* (2013.01);
(Continued)

(58) Field of Classification Search
CPC ............. H04W 52/0216; H04W 76/28; H04W 68/02; H04W 76/048; H04W 72/0446
(Continued)

(56) References Cited

U.S. PATENT DOCUMENTS

2013/0258876 A1* 10/2013 Damji ............... H04W 52/0254
370/252
2013/0308465 A1* 11/2013 Xu ...................... H04W 76/048
370/241
(Continued)

FOREIGN PATENT DOCUMENTS

WO    2009096846 A1    8/2009
WO    2014070077 A1    5/2014

OTHER PUBLICATIONS

Author Unknown, "Technical Specification Group Radio Access Network; Physical layer; Measurements (FDD) (Release 12)," Technical Specification 25.215, Version 12.1.0, 3GPP Organizational Partners, Mar. 2015, 25 pages.
(Continued)

Primary Examiner — Mang Hang Yeung
(74) Attorney, Agent, or Firm — Withrow & Terranova, PLLC

(57) ABSTRACT

Systems and methods relating to operation under multi-level discontinuous activity configuration are disclosed. In some embodiments, a method of operation of a User Equipment device (UE) is disclosed. The multi-level discontinuous activity configuration is associated with a first level and a second level of discontinuous activity configuration. In some embodiments, the method comprises obtaining a configuration of the first level of a multi-level discontinuous activity. The first level of the multi-level discontinuous activity configuration is associated with a first discontinuous activity cycle that is longer than a second discontinuous activity cycle associated with the second level of the multi- (Continued)

level discontinuous activity. The method further comprises adapting at least one procedure related to the configuration of the first level of the multi-level discontinuous activity and/or at least one parameter in the configuration of the first level of the multi-level discontinuous activity.

29 Claims, 9 Drawing Sheets

(51) Int. Cl.
  *H04W 76/28* (2018.01)
  *H04W 68/02* (2009.01)
  *H04W 72/04* (2009.01)
  *H04W 36/00* (2009.01)

(52) U.S. Cl.
  CPC ........ *H04W 76/28* (2018.02); *H04W 36/0083* (2013.01); *Y02D 70/1242* (2018.01); *Y02D 70/1262* (2018.01); *Y02D 70/142* (2018.01); *Y02D 70/21* (2018.01); *Y02D 70/24* (2018.01)

(58) Field of Classification Search
  USPC .......................................................... 370/311
  See application file for complete search history.

(56) References Cited

U.S. PATENT DOCUMENTS

| | | | | |
|---|---|---|---|---|
| 2015/0163745 | A1* | 6/2015 | Kim | H04W 52/0235 370/311 |
| 2016/0242231 | A1* | 8/2016 | Vajapeyam | H04W 24/08 |
| 2016/0330791 | A1* | 11/2016 | Vajapeyam | H04W 68/005 |
| 2016/0338143 | A1* | 11/2016 | Johansson | H04W 76/048 |
| 2017/0048772 | A1* | 2/2017 | Gheorghiu | H04W 36/14 |
| 2018/0049269 | A1* | 2/2018 | Fujishiro | H04W 76/048 |

OTHER PUBLICATIONS

Author Unknown, "Technical Specification Group Radio Access Network; Evolved Universal Terrestrial Radio Access (E-UTRA); Requirements for support of radio resource management (Release 13)," Technical Specification 36.133, Version 13.3.0, 3GPP Organizational Partners, Mar. 2016, 1,581 pages.

Author Unknown, "Technical Specification Group Radio Access Network; Evolved Universal Terrestrial Radio Access (E-UTRA); Physical layer; Measurements (Release 12)," Technical Specification 36.214, Version 12.2.0, 3GPP Organizational Partners, Mar. 2015, 17 pages.

Author Unknown, "Technical Specification Group Radio Access Network; Evolved Universal Terrestrial Radio Access (E-UTRA); User Equipment (UE) procedures in idle mode (Release 12)," Technical Specification 36.304, Version 12.6.0, 3GPP Organizational Partners, Sep. 2015, 38 pages.

Author Unknown, "Technical Specification Group Radio Access Network; Evolved Universal Terrestrial Radio Access (E-UTRA); User Equipment (UE) procedures in idle mode (Release 13)," Technical Specification 36.304, Version 13.0.0, 3GPP Organizational Partners, Dec. 2015, 42 pages.

Ericsson, "R4-156469: On eDRX measurement requirements in RRC_Connected state," 3rd Generation Partnership Project (3GPP), TSG RAN WG4 Meeting #76bis, Oct. 12-16, 2015, 2 pages, Sophia Antipolis, France.

Ericsson, "R4-156470: On eDRX measurement requirements in RRC_Idle state," 3rd Generation Partnership Project (3GPP), TSG RAN WG4 Meeting #76bis, Oct. 12-16, 2015, 5 pages, Sophia Antipolis, France.

Ericsson, et al., "R4-161225: Measurement requirements in RRC Connected state," 3rd Generation Partnership Project (3GPP), TSG-RAN WG4 Meeting #78, Technical Specification 36.133, Change Request 3366, Version 13.2.0, Feb. 15-19, 2016, 88 pages, Malta.

Ericsson, et al., "R4-161443: Measurement requirements in RRC Idle state," 3rd Generation Partnership Project (3GPP), TSG-RAN WG4 Meeting #78, Technical Specification, 36133, Change Request 3367, Version 13.2.0, Feb. 15-19, 2016, 24 pages, Malta.

International Search Report and Written Opinion for International Patent Application No. PCT/SE2016/050643, dated Nov. 16, 2016, 19 pages.

* cited by examiner

Example eDRX Configuration

Another Example eDRX Configuration

*H-SFN Concept*

*H-SFN Based Paging for eDRX* eDRX in UTRA

DRX in LTE

SYSTEMS AND METHODS FOR OPERATION UNDER MULTI-LEVEL DISCONTINUOUS ACTIVITY CONFIGURATION

RELATED APPLICATIONS

This application is a 35 U.S.C. § 371 national phase filing of International Application No. PCT/SE2016/050643, filed Jun. 28, 2016, which claims the benefit of US Provisional Application No. 62/237,341, filed Oct. 5, 2015, the disclosure of which is incorporated herein by reference in its entirety.

TECHNICAL FIELD

The present disclosure relates to multi-level discontinuous activity in a cellular communications network.

BACKGROUND

I. Enhanced Discontinuous Reception (eDRX) (extended Discontinuous Reception (DRX))

Power consumption is important for User Equipment devices (UEs) using battery or an external power supply and its importance increases with the continued growth of device populations and more demanding use cases. The importance can be illustrated by following scenarios, e.g.:

For Machine to Machine (M2M) use cases like sensors that run on battery it is a major cost to on site exchange (or charge) the batteries for a large amount of devices and the battery lifetime may even determine the device's lifetime if it is not foreseen to charge or replace the battery;

Even for scenarios where UEs may consume power from an external power supply, it may be desirable to consume less power for energy efficiency purposes.

Enhancing DRX operation, currently discussed in $3^{rd}$ Generation Partnership Project (3GPP), is a way to improve battery saving in the UE. DRX makes the UE reachable during predefined occasions without resulting in unnecessary signaling. As currently defined, DRX cycles in Long Term Evolution (LTE) can at most be 2.56 seconds and thus would not allow for sufficient power savings for UEs that only need to wake-up infrequently (e.g., every few or tens of minutes) for data. Hence, DRX cycle extension is required in order to enable significant battery savings for such UEs. Furthermore, the DRX cycle can be set depending on the data delay tolerance and power saving requirements, thus providing a flexible solution for achieving significant UE battery savings.

Currently, 3GPP is defining eDRX operation for UEs in CONNECTED mode in LTE and for UEs in IDLE mode in LTE and Universal Terrestrial Radio Access (UTRA). In LTE, the eDRX in IDLE mode is based on the Hyper System Frame Number (H-SFN) concept.

a. eDRX in LTE i. In CONNECTED Mode

For CONNECTED mode, the eDRX concept remains still unclear, but it was decided to extend the DRX cycle up to 10.24 seconds, which may for example look as illustrated FIG. 1A or FIG. 1B.

ii. In IDLE Mode

The H-SFN is a means to extend the current System Frame Number (SFN) range which is limited to 0 to 1023, as depicted in the FIG. 2A. As an example, in FIG. 2A, 10 bits of extension are used where each H-SFN contains 1024 SFNs, and therefore spans across 10.24 seconds. However, the actual H-SFN range is still not decided.

For extended idle mode DRX, the paging frames for the UE consist of:

1. H-SFN value or values: The H-SFN value(s) provide the hyper frame/frames at which the UE may be paged, i.e., the Paging Hyper-frames (PHs).
2. SFN value or values: The SFN value(s) provide the legacy frame/frames at which the UE expects to be paged within each PH. The legacy paging frames are within a Paging Window (PW).

This is illustrated in FIG. 2B.

b. eDRX in UTRA

In eDRX for UTRA (for IDLE UEs), the DRX cycle is prolonged to some seconds which is much longer than the legacy DRX cycles. The DRX cycle consists of a long sleep period, then the UE wakes up to a Paging Transmission Window (PTW) where there are N_PTW paging occasions with the legacy Packet-Switched (PS) DRX cycle. This is shown in FIG. 3.

II. (Normal) DRX in LTE a. General Principles

In LTE, DRX has been introduced as one of the key solutions to conserve battery power in mobile terminals. DRX is characterized by the following:

Per UE mechanism (as opposed to per radio bearer);

May be used in RRC_IDLE and RRC_CONNECTED. In RRC_CONNECTED, the enhanced or evolved Node B (eNB)/UE may initiate the DRX mode when there are no outstanding/new packets to be transmitted/received. In RRC_IDLE:

$2^{nd}$ Generation (2G) and $3^{rd}$ Generation (3G) terminals use DRX in IDLE state to increase battery lifetime. High Speed Packet Access (HSPA) and LTE have introduced DRX also for connected state.

Available DRX values are controlled by the network and start from non-DRX up to x seconds;

Hybrid Automatic Repeat Request (HARQ) operation related to data transmission is independent of DRX operation and the UE wakes up to read the Physical Downlink Control Channel (PDCCH) for possible retransmissions and/or Acknowledgement (ACK)/Negative Acknowledgement (NACK) signaling regardless of DRX. In the downlink, a timer is used to limit the time that the UE stays awake waiting for a retransmission;

When DRX is configured, the UE may be further configured with an "on-duration" timer during which time the UE monitors the PDCCHs for possible allocations;

When DRX is configured, periodic Channel Quality Index (CQI) reports can only be sent by the UE during the "active-time." Radio Resource Control (RRC) can further restrict periodic CQI reports so that they are only sent during the on-duration; and The eNB does not transmit packets to UE during the sleep mode.

RRC_CONNECTED mode DRX should not be mixed up with DRX in IDLE mode which the mobile device is set into after a prolonged time of air interface inactivity. This is also known as paging DRX, i.e. the time the mobile device can go to sleep between two paging messages which could contain a command for the mobile device to wake up again and change back to RRC_CONNECTED state. This DRX is much less fine grained and measured in hundreds of milliseconds or even seconds.

b. Parameters Related to DRX

The following definitions apply to DRX in Evolved Universal Terrestrial Radio Access Network (E-UTRAN):

on-duration: On-duration is the duration in downlink subframes that the UE waits, after waking up from DRX, to receive PDCCHs. If the UE successfully decodes a PDCCH, the UE stays awake and starts the inactivity timer.

inactivity timer: Inactivity timer is the duration in downlink subframes that the UE waits to successfully decode a PDCCH, from the last successful decoding of a PDCCH, failing which it re-enters DRX. The UE restarts the inactivity timer following a single successful decoding of a PDCCH for a first transmission only (i.e., not for retransmissions).

active time: Active time is the total duration that the UE is awake. This includes the "on-duration" of the DRX cycle, the time UE is performing continuous reception while the inactivity timer has not expired and the time UE is performing continuous reception while waiting for a downlink retransmission after one HARQ Round Trip Time (RTT). Based on the above the minimum active time is of length equal to on-duration, and the maximum is undefined (infinite).

Of the above parameters, the on-duration and inactivity timer are of fixed lengths, while the active time is of varying lengths based on scheduling decision and UE decoding success. Only on-duration and inactivity timer duration are signaled to the UE by the eNB:

There is only one DRX configuration applied in the UE at any time;

UE shall apply an on-duration on wake-up from DRX sleep.

DRX mode in LTE is illustrated in FIG. 4.

DRX is triggered by means of an inactivity time known as DRX. As can be seen from FIG. 4, the UE activity time may be extended if PDCCH is received during ON duration time. However, it may also be shorten by a Medium Access Control (MAC) DRX command, upon reception of which the UE stops onDurationTimer (i.e., the on-duration timers) and drx-InactivityTimer (i.e., the inactivity timer).

If PDCCH has not been successfully decoded during the on-duration, the UE follows the DRX configuration (i.e., the UE can enter DRX sleep if allowed by the DRX configuration):

This applies also for the subframes where the UE has been allocated predefined resources.

If it successfully decodes a PDCCH for a first transmission, the UE shall stay awake and start the inactivity timer (even if a PDCCH is successfully decoded in the subframes where the UE has also been allocated predefined resources) until a MAC control message tells the UE to re-enter DRX, or until the inactivity timer expires. In both cases, the DRX cycle that the UE follows after re-entering DRX is given by the following rules:

If a short DRX cycle is configured, the UE first follows the short DRX cycle and after a longer period of inactivity the UE follows the long DRX cycle; if short DRX cycle is used, the long cycle will be a multiple of the short cycle;

Durations for long and short DRX are configured by the RRC. The transition between the short and long DRX cycles is determined by the eNB MAC commands (if the command is received and short DRX is configured, the UE will (re)start drxShortCycleTimer and use the short DRX cycle; otherwise long DRX will be used) or by the UE based on an activity timer;

Else the UE follows the long DRX cycle directly.

Some parameters that may be configured by the network:

onDurationTimer can be (in PDCCH subframes) 1, 2, 3, 4, 5, 6, 8, 10, 20, 30, 40, 50, 60, 80, 100, or 200;

drx-InactivityTimer can be (in PDCCH subframes) 1, 2, 3, 4, 5, 6, 8, 10, 20, 30, 40, 50, 60, 80, 100, 200, 300, 500, 750, 1280, 1920, or 2560 where a specific value may also be configured if the UE supports In-Device Coexistence (IDC);

longDRX-CycleStartOffset can be (in subframes), depending on the cycle length, up to 2559; and shortDRX-cycle can be (in subframes) 2, 5, 8, 10, 16, 20, 32, 40, 64, 80, 128, 160, 256, 320, 520, or 640.

c. UE Active Time and UE Transmissions when Using DRX

When a DRX cycle is configured, the active time includes the time while:

onDurationTimer or drx-InactivityTimer or drx-RetransmissionTimer or mac-Contention ResolutionTimer is running; or a scheduling request is sent on Physical Uplink Control Channel (PUCCH) and is pending; or an uplink grant for a pending HARQ retransmission can occur and there is data in the corresponding HARQ buffer; or a PDCCH indicating a new transmission addressed to the Cell Radio Network Temporary Identifier (C-RNTI) of the UE has not been received after successful reception of a random access response for the preamble not selected by the UE.

Generally, new transmissions can only take place during the active time (so that when the UE is waiting for one retransmission only, it does not have to be "awake" during the RTT).

When not in active time, type-0-triggered Sounding Reference Signals (SRSs) are not to be reported.

If CQI masking (cqi-Mask) is setup by upper layers:

when onDurationTimer is not running, CQI/Precoding Matrix Indicator (PMI)/Rank Indicator (RI)/Procedure Transaction Identity (PTI) on PUCCH shall not be reported, else:

when not in active time, CQI/PMI/RI/PTI on PUCCH shall not be reported.

That is, cqi-Mask is effectively limiting CQI/PMI/PTI/RI reports to the on-duration period of the DRX cycle, and the same one value applies for all serving cells (the associated functionality is common, i.e. not performed independently for each cell).

There are a few exceptions:

Regardless of whether the UE is monitoring PDCCH or not, the UE receives and transmits HARQ feedback and transmits type-1-triggered SRS when such is expected.

A UE may optionally choose to not send CQI/PMI/RI/PTI reports on PUCCH and/or type-0-triggered SRS transmissions for up to 4 subframes following a PDCCH indicating a new transmission (uplink or downlink) received in subframe n-i, where n is the last subframe of active time and i is an integer value from 0 to 3. After active time is stopped due to the reception of a PDCCH or a MAC control element a UE may optionally choose to continue sending CQI/PMI/RI/PTI reports on PUCCH and/or SRS transmissions for up to 4 subframes. The choice not to send CQI/PMI/RI/PTI reports on PUCCH and/or type-0-triggered SRS transmissions is not applicable for subframes where onDuration-Timer is running and is not applicable for subframes n-i to n.

III. Problems with Existing Solutions

At least the following problems may be envisioned with the existing eDRX solutions. The PW may be shorter than the required time to perform a measurement and thus insufficient for completing the UE measurement procedure within one window and meet the existing requirements. Also, UE behavior is unclear when eDRX is configured, which can be quite long. There are currently no UE requirements, e.g., to ensure UE measurement performance.

SUMMARY

Systems and methods relating to operation under multi-level discontinuous activity configuration are disclosed. In some embodiments, a method of operation of a User Equipment device (UE) for adapting activity of the UE under multi-level discontinuous activity configuration is disclosed. The multi-level discontinuous activity configuration is associated with a first level and a second level of discontinuous activity configuration. In some embodiments, the method of operation of the UE comprises obtaining a configuration of the first level of a multi-level discontinuous activity. The first level of the multi-level discontinuous activity configuration is associated with a first discontinuous activity cycle that is longer than a second discontinuous activity cycle associated with the second level of the multi-level discontinuous activity. The method further comprises adapting at least one procedure related to the configuration of the first level of the multi-level discontinuous activity and/or at least one parameter in the configuration of the first level of the multi-level discontinuous activity. In this manner, the UE is enabled to adapt its activity under multi-level discontinuous activity configuration to, e.g., meet predefined requirements for a wide range of combinations of multi-level discontinuous activity configurations (e.g., very long enhanced Discontinuous Reception (eDRX) configurations and very short Discontinuous Reception (DRX) configurations). In addition, at least in some embodiments, the UE is in this manner enabled to perform consistently for different multi-level discontinuous activity configurations, which in turn makes the network aware of the UE behavior.

In some embodiments, the multi-level discontinuous activity configuration comprises at least one first time interval and at least one second time interval, where the at least one first time interval comprises one or more of the first discontinuous activity cycles, the at least one second time interval comprises one or more of the second discontinuous activity cycles, and the one or more of the first discontinuous activity cycles are longer than the one or more of the second discontinuous activity cycles.

In some embodiments, adapting the at least one procedure related to the configuration of the first level of the multi-level discontinuous activity and/or the at least one parameter in the configuration of the first level of the multi-level discontinuous activity comprises adapting the at least one procedure related to the configuration of the first level of the multi-level discontinuous activity.

In some embodiments, adapting the at least one procedure related to the configuration of the first level of the multi-level discontinuous activity and/or the at least one parameter in the configuration of the first level of the multi-level discontinuous activity comprises adapting the at least one procedure related to the configuration of the first level of the multi-level discontinuous activity and/or the at least one parameter in the configuration of the first level of the multi-level discontinuous activity such that at least one predefined requirement associated with the one or more operations is satisfied. Further, in some embodiments, the at least one predefined requirement comprise at least one of: a cell identification delay, a physical layer measurement period, a measurement accuracy, a number of cells which the UE can measure over the physical layer measurement period, a measurement reporting delay, a number of carriers on which the UE can perform measurements, evaluation time of serving cell, and cell reselection delay.

In some embodiments, the configuration of the first level of the multi-level discontinuous activity comprises a first cycle length for the first level of the multi-level discontinuous activity, the one or more operations comprise a measurement, and adapting the at least one procedure related to the configuration of the first level of the multi-level discontinuous activity and/or the at least one parameter in the configuration of the first level of the multi-level discontinuous activity comprises adapting a length of a measurement sample for the measurement and/or a measurement sampling rate for the measurement as a function of the first cycle length for the first level of the multi-level discontinuous activity. Further, in some embodiments, adapting the length of the measurement sample for the measurement and/or the measurement sampling rate for the measurement as a function of the first cycle length of the first level of the multi-level discontinuous activity comprises adapting the length of the measurement sample for the measurement as a function of the first cycle length for the first level of the multi-level discontinuous activity.

In some embodiments, adapting the at least one procedure related to the configuration of the first level of the multi-level discontinuous activity and/or the at least one parameter in the configuration of the first level of the multi-level discontinuous activity comprises adapting the at least one procedure related to the configuration of the first level of the multi-level discontinuous activity and/or the at least one parameter in the configuration of the first level of the multi-level discontinuous activity based on at least one of a predefined rule and control information from another node.

In some embodiments, adapting the at least one procedure related to the configuration of the first level of the multi-level discontinuous activity and/or the at least one parameter in the configuration of the first level of the multi-level discontinuous activity comprises selectively adapting the at least one procedure related to the configuration of the first level of the multi-level discontinuous activity and/or the at least one parameter in the configuration of the first level of the multi-level discontinuous activity upon determining that one or more predefined conditions are satisfied.

In some embodiments, adapting the at least one procedure related to the configuration of the first level of the multi-level discontinuous activity and/or the at least one parameter in the configuration of the first level of the multi-level discontinuous activity comprises determining or extending an amount of time needed to complete the one or more operations with the first level of the multi-level discontinuous activity.

In some embodiments, adapting the at least one procedure related to the configuration of the first level of the multi-level discontinuous activity and/or the at least one parameter in the configuration of the first level of the multi-level discontinuous activity comprises determining an amount of time needed to complete the one or more operations with the first level of the multi-level discontinuous activity. Further, in some embodiments, the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity and a second cycle length for the second level of the multi-level discontinuous activity configured for the UE. In some other embodiments, the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity, a second cycle length for the second level of the multi-level discontinuous activity configured for the UE, and a Paging Window (PW) of the first cycle length for the first level of the multi-level discontinuous activity configured for the UE. In some other embodiments, the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity, a second cycle length for the second level of the multi-level discontinuous activity configured for the UE, a first PW of the first cycle length for the first level of the multi-level discontinuous activity configured for the UE, and a second PW of the second cycle length for the second level of the multi-level discontinuous activity configured for the UE.

In some embodiments, adapting the at least one procedure related to the configuration of the first level of the multi-level discontinuous activity comprises adapting an intra-frequency measurement procedure. In some embodiments, adapting the intra-frequency measurement procedure comprises adapting the intra-frequency measurement procedure such that a measurement requirement for the intra-frequency measurement procedure is equal to 1 times a second cycle length for the second level of the multi-level discontinuous activity configured for the UE for any cycle length in a predefined set of cycle lengths for the second level of the multi-level discontinuous activity. Further, in some embodiments, the predefined set of cycle lengths comprises: 0.32 seconds, 0.64 seconds, 1.28 seconds, and 2.56 seconds. In some embodiments, the measurement procedure is an IDLE mode measurement procedure.

In some embodiments, adapting the at least one procedure related to the configuration of the first level of the multi-level discontinuous activity comprises adapting an inter-frequency measurement procedure. In some embodiments, adapting the inter-frequency measurement procedure comprises adapting the inter-frequency measurement procedure such that measurement requirement for the inter-frequency measurement procedure is equal to 1 times a second cycle length for the second level of the multi-level discontinuous activity configured for the UE for any cycle length in a predefined set of cycle lengths for the second level of the multi-level discontinuous activity. Further, in some embodiments, the predefined set of cycle lengths comprises: 0.32 seconds, 0.64 seconds, 1.28 seconds, and 2.56 seconds. In some embodiments, the measurement procedure is an IDLE mode measurement procedure.

In some embodiments, adapting the at least one procedure related to the configuration of the first level of the multi-level discontinuous activity comprises adapting an inter-Radio Access Technology (inter-RAT) measurement procedure. In some embodiments, adapting the inter-RAT measurement procedure comprises adapting the inter-RAT measurement procedure such that a measurement requirement for the inter-RAT measurement procedure is equal to 3 times a second cycle length for the second level of the multi-level discontinuous activity configured for the UE for any cycle length in a predefined set of cycle lengths for the second level of the multi-level discontinuous activity. In some embodiments, the predefined set of cycle lengths comprises: 0.32 seconds, 0.64 seconds, 1.28 seconds, and 2.56 seconds. In some embodiments, the measurement procedure is an IDLE mode measurement procedure.

In some embodiments, adapting the at least one procedure related to the configuration of the first level of the multi-level discontinuous activity and/or the at least one parameter in the configuration of the first level of the multi-level discontinuous activity comprises providing carrier grouping such that the one or more operations are performed on a first group of carrier frequencies in a first cycle of the first level of the multi-level discontinuous activity and the one or more operations are performed on a second group of carrier frequencies in a second cycle of the first level of the multi-level discontinuous activity.

In some embodiments, adapting at least one procedure related to the configuration of the first level of the multi-level discontinuous activity and/or the at least one parameter in the configuration of the first level of the multi-level discontinuous activity comprises adapting a UE measurement procedure such that measurement occasions are aligned with cycle periods of the first level of the multi-level discontinuous activity.

In some embodiments, adapting the at least one procedure related to the configuration of the first level of the multi-level discontinuous activity and/or the at least one parameter in the configuration of the first level of the multi-level discontinuous activity comprises adapting UE sampling and sample processing.

In some embodiments, the multi-level discontinuous activity configuration comprises at least one first and one second time intervals where the at least one first time interval comprises one or more of the first discontinuous activity cycles and the second time interval comprises one or more of the second discontinuous activity cycles that are shorter than the one or more of the first discontinuous activity cycles, and adapting the at least one procedure related to the configuration of the first level of the multi-level discontinuous activity and/or the at least one parameter in the configuration of the first level of the multi-level discontinuous activity comprises spreading the one or more operations over two or more consecutive window periods of the at least one first time interval.

In some embodiments, the multi-level discontinuous activity configuration comprises at least one first and one second time intervals where the at least one first time interval comprises one or more of the first discontinuous activity cycles and the second time interval comprises one or more of the second discontinuous activity cycles that are shorter than the one or more of the first discontinuous activity cycles, and adapting the at least one procedure related to the configuration of the first level of the multi-level discontinuous activity and/or the at least one parameter in the configuration of the first level of the multi-level discontinuous activity comprises adapting a window size of the at least one first time interval.

In some embodiments, adapting the at least one procedure related to the configuration of the first level of the multi-level discontinuous activity and/or the at least one parameter in the configuration of the first level of the multi-level discontinuous activity comprises adapting a second cycle length for the second level of the multi-level discontinuous activity.

Embodiments of a UE for a cellular communications network are also disclosed. In some embodiments, the UE comprises at least one transceiver, at least one processor, and memory storing instructions executable by the at least one processor whereby, in order to adapt activity of the UE under multi-level discontinuous activity configuration, wherein the multi-level discontinuous activity configuration is associated with a first level and a second level of discontinuous activity configuration, the UE is operable to obtain a configuration of the first level of a multi-level discontinuous activity and adapt at least one procedure related to the configuration of the first level of the multi-level discontinuous activity and/or at least one parameter in the configuration of the first level of the multi-level discontinuous activity. The first level of the multi-level discontinuous activity configuration is associated with a first discontinuous activity cycle that is longer than a second discontinuous activity cycle associated with the second level of the multi-level discontinuous activity.

In some embodiments, via execution of the instructions by the at least one processor, the UE is operable to adapt the at least one procedure related to the configuration of the first level of the multi-level discontinuous activity.

In some embodiments, the configuration of the first level of the multi-level discontinuous activity comprises a first cycle length for the first level of the multi-level discontinuous activity, the one or more operations comprise a measurement. In order to adapt the at least one procedure related to the configuration of the first level of the multi-level discontinuous activity, the UE is operable to adapt a length of a measurement sample for the measurement and/or a measurement sampling rate for the measurement as a function of the first cycle length of the first level of the multi-level discontinuous activity. In some embodiments, via execution of the instructions by the at least one processor, the UE is operable to adapt the length of the measurement sample for the measurement as a function of the first cycle length of the first level of the multi-level discontinuous activity.

In some embodiments, in order to adapt the at least one procedure related to the configuration of the first level of the multi-level discontinuous activity and/or the at least one parameter in the configuration of the first level of the multi-level discontinuous activity, the UE is operable to adapt the at least one procedure related to the configuration of the first level of the multi-level discontinuous activity and/or the at least one parameter in the configuration of the first level of the multi-level discontinuous activity based on at least one of a predefined rule and control information from another node.

In some embodiments, adaption of the at least one procedure related to the configuration of the first level of the multi-level discontinuous activity and/or the at least one parameter in the configuration of the first level of the multi-level discontinuous activity comprises determination of or extension of an amount of time needed to complete the one or more operations with the first level of the multi-level discontinuous activity.

In some embodiments, adaptation of the at least one procedure related to the configuration of the first level of the multi-level discontinuous activity and/or the at least one parameter in the configuration of the first level of the multi-level discontinuous activity comprises determination of an amount of time needed to complete the one or more operations with the first level of the multi-level discontinuous activity. In some embodiments, the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity and a second cycle length for the second level of the multi-level discontinuous activity configured for the UE. In some other embodiments, the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity, a second cycle length for the second level of the multi-level discontinuous activity configured for the UE, and a PW configured for the UE.

In some embodiments, the at least one procedure related to the configuration for the first level of the multi-level discontinuous activity comprises an intra-frequency measurement procedure. In some embodiments, the UE is operable to adapt the intra-frequency measurement procedure such that a measurement requirement for the intra-frequency measurement procedure is equal to 1 times a second cycle length for the second level of the multi-level discontinuous activity configured for the UE for any cycle length in a predefined set of cycle lengths for the second level of the multi-level discontinuous activity. In some embodiments, the predefined set of cycle lengths comprises: 0.32 seconds, 0.64 seconds, 1.28 seconds, and 2.56 seconds.

In some embodiments, the at least one procedure related to the configuration of the first level of the multi-level discontinuous activity comprises an inter-frequency measurement procedure. In some embodiments, the UE is operable to adapted the inter-frequency measurement procedure such that a measurement requirement for the inter-frequency measurement procedure is equal to 1 times a second cycle length for the second level of the multi-level discontinuous activity configured for the UE for any cycle length in a predefined set of cycle lengths for the second level of the multi-level discontinuous activity. In some embodiments, the predefined set of cycle lengths comprises: 0.32 seconds, 0.64 seconds, 1.28 seconds, and 2.56 seconds.

In some embodiments, the at least one procedure related to the configuration of the first level of the multi-level discontinuous activity comprises an inter-RAT measurement procedure. In some embodiments, the UE is operable to adapt the inter-RAT measurement procedure such that a measurement requirement for the inter-RAT measurement procedure is equal to 3 times a second cycle length for the second level of the multi-level discontinuous activity configured for the UE for any cycle in a predefined set of cycle lengths for the second level of the multi-level discontinuous activity. In some embodiments, the predefined set of cycle lengths comprises: 0.32 seconds, 0.64 seconds, 1.28 seconds, and 2.56 seconds.

In some embodiments, a UE for a cellular communications network is configured to, in order to adapt activity of the UE under multi-level discontinuous activity configuration wherein the multi-level discontinuous activity configuration is associated with a first level and a second level of discontinuous activity configuration: obtain a configuration of the first level of a multi-level discontinuous activity and adapt at least one procedure related to the configuration of the first level of the multi-level discontinuous activity and/or at least one parameter in the configuration of the first level of the multi-level discontinuous activity. The first level of the multi-level discontinuous activity configuration is associated with a first discontinuous activity cycle that is longer than a second discontinuous activity cycle associated with the second level of the multi-level discontinuous activity. In some embodiments, the UE is further configured to operate according to the method of operation of a UE according to any of the embodiments described herein.

In some embodiments, a UE for a cellular communications network enabled to adapt activity of the UE under multi-level discontinuous activity configuration wherein the multi-level discontinuous activity configuration is associated with a first level and a second level of discontinuous activity configuration, the UE comprising means for obtaining a configuration of the first level of a multi-level discontinuous activity and means for adapting at least one procedure related to the configuration of the first level of the multi-level discontinuous activity and/or at least one parameter in the configuration of the first level of the multi-level discontinuous activity. The first level of the multi-level discontinuous activity configuration is associated with a first discontinuous activity cycle that is longer than a second discontinuous activity cycle associated with the second level of the multi-level discontinuous activity.

In some embodiments, a UE for a cellular communications network configured to adapt activity of the UE under multi-level discontinuous activity configuration wherein the multi-level discontinuous activity configuration is associated with a first level and a second level of discontinuous activity configuration, comprising and obtaining module and an adapting module. The obtaining module is operable to obtain a configuration of the first level of a multi-level discontinuous activity. The first level of the multi-level discontinuous activity configuration is associated with a first discontinuous activity cycle that is than a second discontinuous activity cycle associated with the second level of the multi-level discontinuous activity. The adapting module is operable to adapt at least one procedure related to the configuration of the first level of the multi-level discontinuous activity and/or at least one parameter in the configuration of the first level of the multi-level discontinuous activity.

In some embodiments, a non-transitory computer readable medium storing software instructions is provided. When executed by at least one processor of a UE, the instructions cause the UE to obtain a configuration of a first level of a multi-level discontinuous activity and adapt at least one procedure related to the configuration of the first level of the multi-level discontinuous activity and/or at least one parameter in the configuration of the first level of the multi-level discontinuous activity. The first level of the multi-level discontinuous activity configuration is associated with a first discontinuous activity cycle that is longer than a second discontinuous activity cycle associated with a second level of the multi-level discontinuous activity.

Embodiments of a computer program are also disclosed. The computer program comprises instructions which, when executed on at least one processor, cause the at least one processor to carry out the method of operation of a UE according to any one of the embodiments disclosed herein. Embodiments of a carrier containing the aforementioned computer program are also disclosed. In some embodiments, the carrier is one of an electronic signal, an optical signal, a radio signal, or a computer readable storage medium.

Embodiments of a method of operation of a network node for adapting multi-level discontinuous activity configuration for one or more UEs are also disclosed. The multi-level discontinuous activity configuration is associated with a first level and a second level of discontinuous activity configuration. In some embodiments, the method of operation of the network node comprises adapting, based on one or more criteria or conditions, one or more parameters associated with multi-level discontinuous activity configuration for the one or more UEs and signaling the adapted multi-level discontinuous activity configuration to the one or more UEs or another network node.

In some embodiments, the multi-level discontinuous activity configuration comprises at least one first time interval and at least one second time interval, where the at least one first time interval comprises one or more of the first discontinuous activity cycles, the at least one second time interval comprises one or more of the second discontinuous activity cycles, and the one or more of the first discontinuous activity cycles are longer than the one or more of the second discontinuous activity cycles.

In some embodiments, adapting the one or more parameters comprises configuring at least one of: $t_{eDRX}$, $t_{DRX}$, $T_{eDRX}$, and $T_{DRX}$ such that one or more conditions are satisfied.

In some embodiments, adapting the one or more parameters comprises avoiding certain DRX configurations that do not satisfy one or more conditions.

In some embodiments, adapting the one or more parameters comprises avoiding certain DRX, eDRX configuration combinations that do not satisfy one or more conditions.

In some embodiments, adapting the one or more parameters comprises aligning DRX and eDRX cycle configuration.

In some embodiments, adapting the one or more parameters comprises obtaining an amount of time needed for completing a UE activity associated with the multi-level discontinuous activity configuration. Further, in some embodiments, obtaining the amount of time needed for completing the UE activity associated with the multi-level discontinuous activity configuration comprises extending an existing amount of time needed for completion of the UE activity.

In some embodiments, adapting the one or more parameters comprises providing a measurement request configuration to allow for carrier grouping whereby measurements are performed by the one or more UEs on a first group of carrier frequencies in a first eDRX cycle and measurements are performed by the one or more UEs on a second group of carrier frequencies in a second eDRX cycle.

In some embodiments, adapting the one or more parameters comprises aligning measurement occasions with $T_{eDRX}$ periods.

In some embodiments, the multi-level discontinuous activity configuration comprises at least one first and one second time intervals where the at least one first time interval comprises one or more of the first discontinuous activity cycles and the second time interval comprises one or more of the second discontinuous activity cycles that are shorter than the one or more of the first discontinuous activity cycles, and adapting the one or more parameters comprises controlling spreading of UE activity over two or more consecutive window periods of the at least one first time interval.

In some embodiments, adapting the one or more parameters comprises adapting eDRX parameters to increase $T_{eDRX}/t_{eDRX}$.

Embodiments of a network node for adapting multi-level discontinuous activity configuration for one or more UEs are also disclosed. The multi-level discontinuous activity configuration is associated with a first level and a second level of discontinuous activity configuration. In some embodiments, the network node comprises at least one processor and memory storing instructions executable by the at least one processor whereby the network node is operable to: adapt, based on one or more criteria or conditions, one or more parameters associated with multi-level discontinuous activity configuration for the one or more UEs, and signal the adapted multi-level discontinuous activity configuration to the one or more UEs or another network node.

In some embodiments, a network node for adapting multi-level discontinuous activity configuration for one or more UEs, wherein the multi-level discontinuous activity configuration is associated with a first level and a second level of discontinuous activity configuration, is adapted to: adapt, based on one or more criteria or conditions, one or more parameters associated with multi-level discontinuous activity configuration for the one or more UEs, and signal the adapted multi-level discontinuous activity configuration to the one or more UEs or another network node.

In some embodiments, the network node is further adapted to perform the method of operation of a network node according to any of the embodiments described herein.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1A:
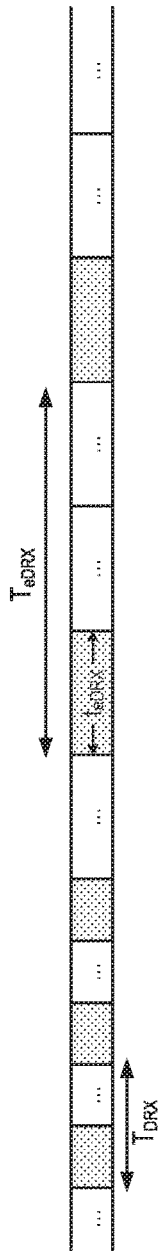
FIGS. 1A and 1B illustrate examples of enhanced Discontinuous Reception (eDRX) configurations.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any two or more embodiments described below may be combined in any way with each other.

In some embodiments a non-limiting term User Equipment device (UE) is used. The UE herein can be any type of wireless device capable of communicating with a network node or another UE over radio signals. The UE may also be a radio communication device, a target device, a Device to Device (D2D) UE, a machine type UE or a UE capable of Machine to Machine (M2M) communication, a sensor equipped with a UE, an iPAD, a tablet, mobile terminals, a smart phone, Laptop Embedded Equipment (LEE), Laptop Mounted Equipment (LME), Universal Serial Bus (USB) dongles, Customer Premises Equipment (CPE), etc.

Also in some embodiments generic terminology "radio network node" or simply "network node" is used. This can be any kind of network node which may comprise of a base station, a radio base station, a base transceiver station, a base station controller, a network controller, an enhanced or evolved Node B (eNB), Node B, a Multi-cell/Multicast Coordination Entity (MCE), a relay node, an access point, a radio access point, a Remote Radio Unit (RRU) or Remote Radio Head (RRH), a core network node (e.g., a Trace Collection Entity (TCE), a Mobility Management Entity (MME), a Minimization of Drive Tests (MDT) node, or a Multimedia Broadcast/Multicast Service (MBMS) node), or even an external node (e.g., a third party node, a node external to the current network), etc.

The term "radio node" used herein may be used to denote a UE or a radio network node.

The embodiments are applicable to single carrier as well as to multicarrier or Carrier Aggregation (CA) operation of the UE in which the UE is able to receive and/or transmit data to more than one serving cells. The term CA is also called (e.g., interchangeably called) "multi-carrier system," "multi-cell operation," "multi-carrier operation," and "multi-carrier" transmission and/or reception. In CA one of the Component Carriers (CCs) is the Primary Component Carrier (PCC) or simply primary carrier or even anchor carrier. The remaining ones are called Secondary Component Carriers (SCCs) or simply secondary carriers or even supplementary carriers. The serving cell is interchangeably called a Primary Cell (PCell) or Primary Serving Cell (PSC). Similarly the secondary serving cell is interchangeably called a Secondary Cell (SCell) or Secondary Serving Cell (SSC).

Herein, a UE activity may comprise, e.g., any operation or activity performed by the UE for receiving and/or transmitting one or more signals from and/or to a cell. Examples of operation or activity are performing one or more of: a measurement (e.g., any of the measurements specified in 3$^{rd}$ Generation Partnership Project (3GPP) Technical Specification (TS) 36.214 or TS 25.215), a bunch of measurements (e.g., intra-frequency measurements for more than one cell, inter-frequency measurements over more than one carrier, etc.), Channel Quality Index (CQI) reporting, Radio Link Monitoring (RLM), cell search, cell selection or reselection, handover, receiving a radio signal or channel or a physical signal, transmitting a radio signal or channel, etc. Specific examples of measurements are Reference Signal Received Power (RSRP), Reference Signal Received Quality (RSRQ), UE reception-transmission time difference, Reference Signal Time Difference (RSTD), Signal to Interference plus Noise Ratio (SINR), Signal to Noise Ratio (SNR), Cell Global Identification (CGI) or Evolved Universal Terrestrial Radio Access (E-UTRA) CGI (ECGI) identification delay, Global System for Mobile Communications (GSM) carrier Received Signal Strength Indicator (RSSI), IEEE 802.11 Beacon RSSI, Common Pilot Channel (CPICH) Received Signal Code Power (RSCP), CPICH Ec/No, etc. Specific examples of channels are Physical Downlink Control Channel (PDCCH), Physical Downlink Shared Channel (PDSCH), Enhanced PDCCH (E-PDCCH), Machine Type Communication (MTC) PDCCH (M-PDCCH), MTC PDSCH (M-PDSCH), etc. Specific examples of physical signals are Reference Signals (RSs) like discovery RS (DRS), Cell-Specific RS (CRS), Channel State Information RS (CSI-RS), Primary Synchronization Signal (PSS)/Secondary Synchronization Signal (SSS), etc.

Figure 5:
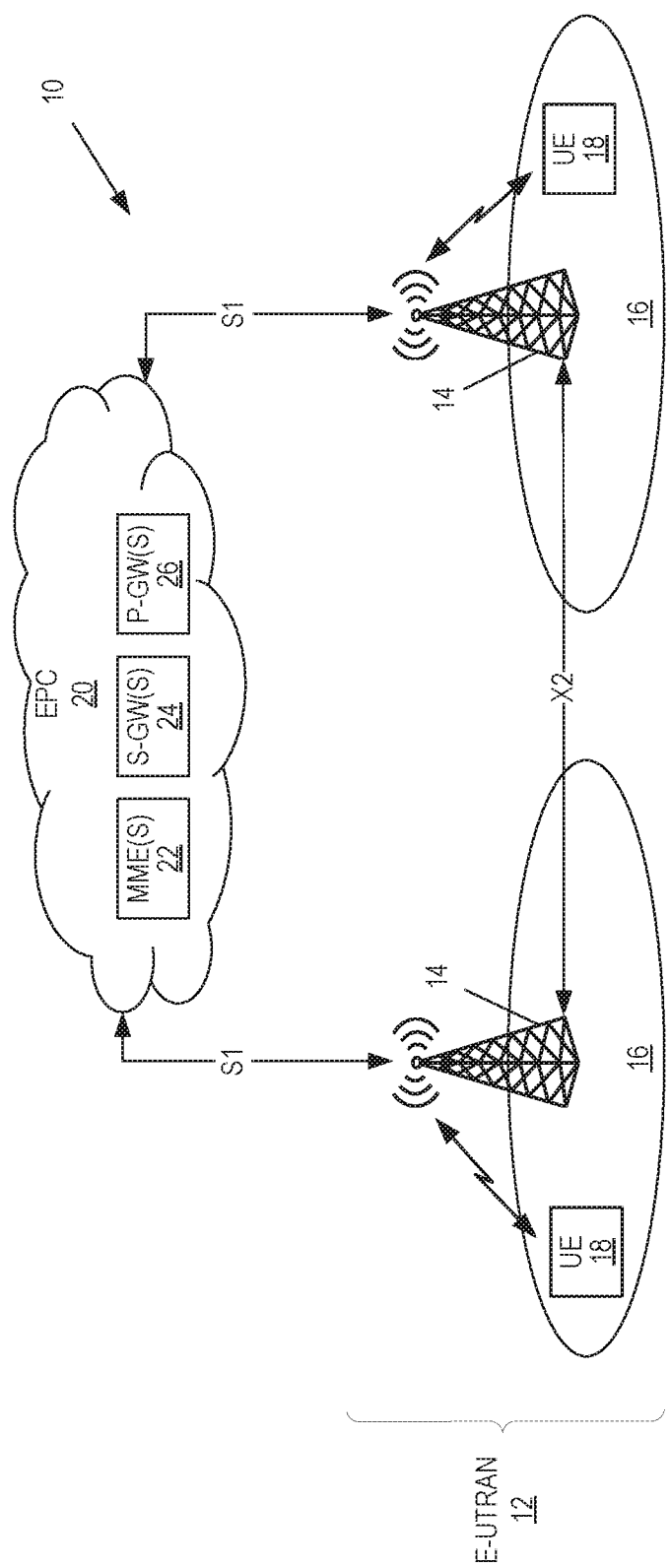
FIG. 5 illustrates one example of a cellular communications network.

FIG. 5 illustrates one example of a cellular communications network 10 in which embodiments of the present disclosure can be implemented. As illustrated, the cellular communications network 10 includes a Radio Access Network (RAN) 12 (e.g., an Evolved Universal Mobile Telecommunications System (UMTS) Radio Access Network (E-UTRAN) for Long Term Evolution (LTE)) including base stations 14 providing cells 16 of the cellular communications network 10. The base stations 14 provide radio access to UEs 18 located within the respective cells 16. The base stations 14 may be communicatively coupled via a base station to base station interface (e.g., an X2 interface in LTE). Further, the base stations 14 are connected to a core network 20 (e.g., an Evolved Packet Core (EPC) in LTE) via corresponding interfaces (e.g., S1 interfaces in LTE). The core network 20 includes various core network nodes such as, e.g., MMEs 22, Serving Gateways (S-GWs) 24, and Packet Data Network (PDN) Gateways (P-GWs) 26, as will be appreciated by one of ordinary skill in the art.

Multi-Level Discontinuous Activity Configuration

Figure 1B:
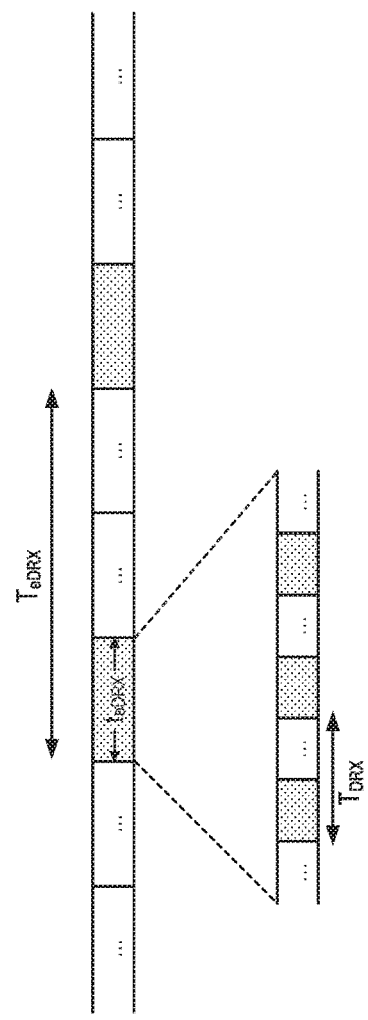
Figure 2A:
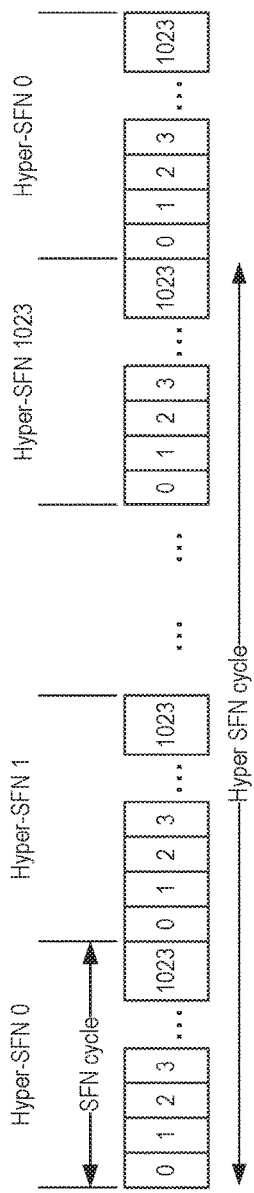
FIG. 2A illustrates a Hyper System Frame Number (H-SFN) concept.
Figure 2B:
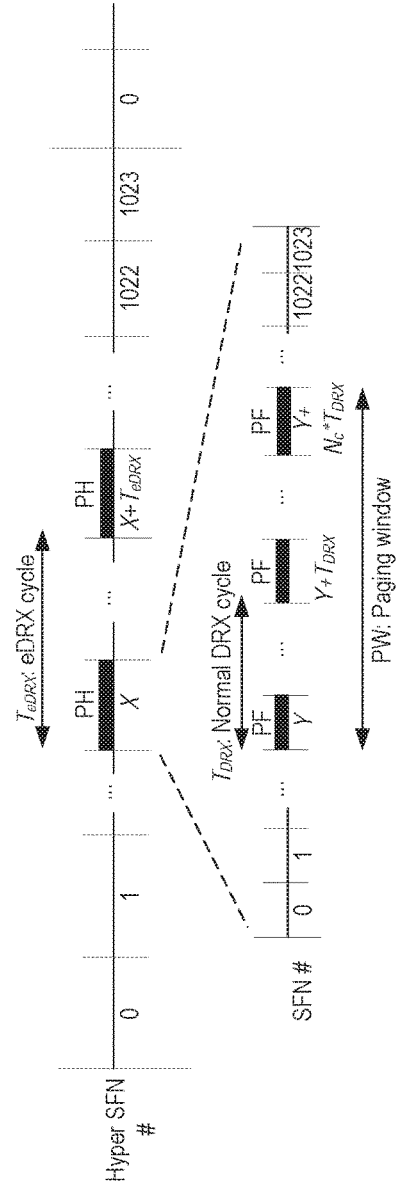
FIG. 2B illustrates H-SFN based paging for eDRX.
Figure 3:
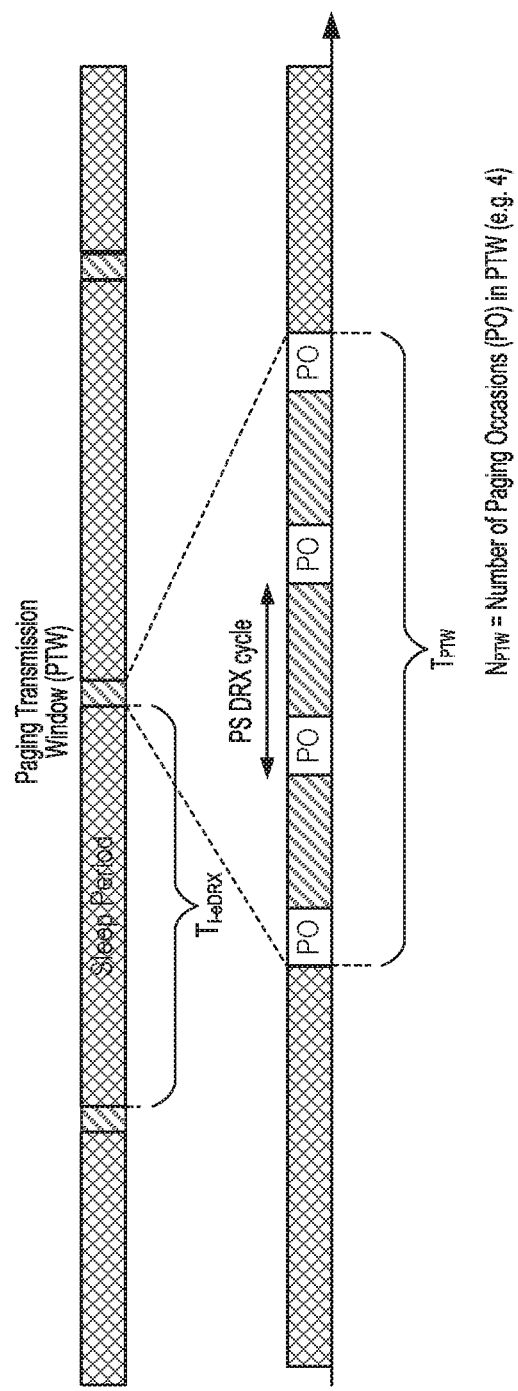
FIG. 3 illustrates eDRX in Universal Terrestrial Radio Access (UTRA)
Figure 4:
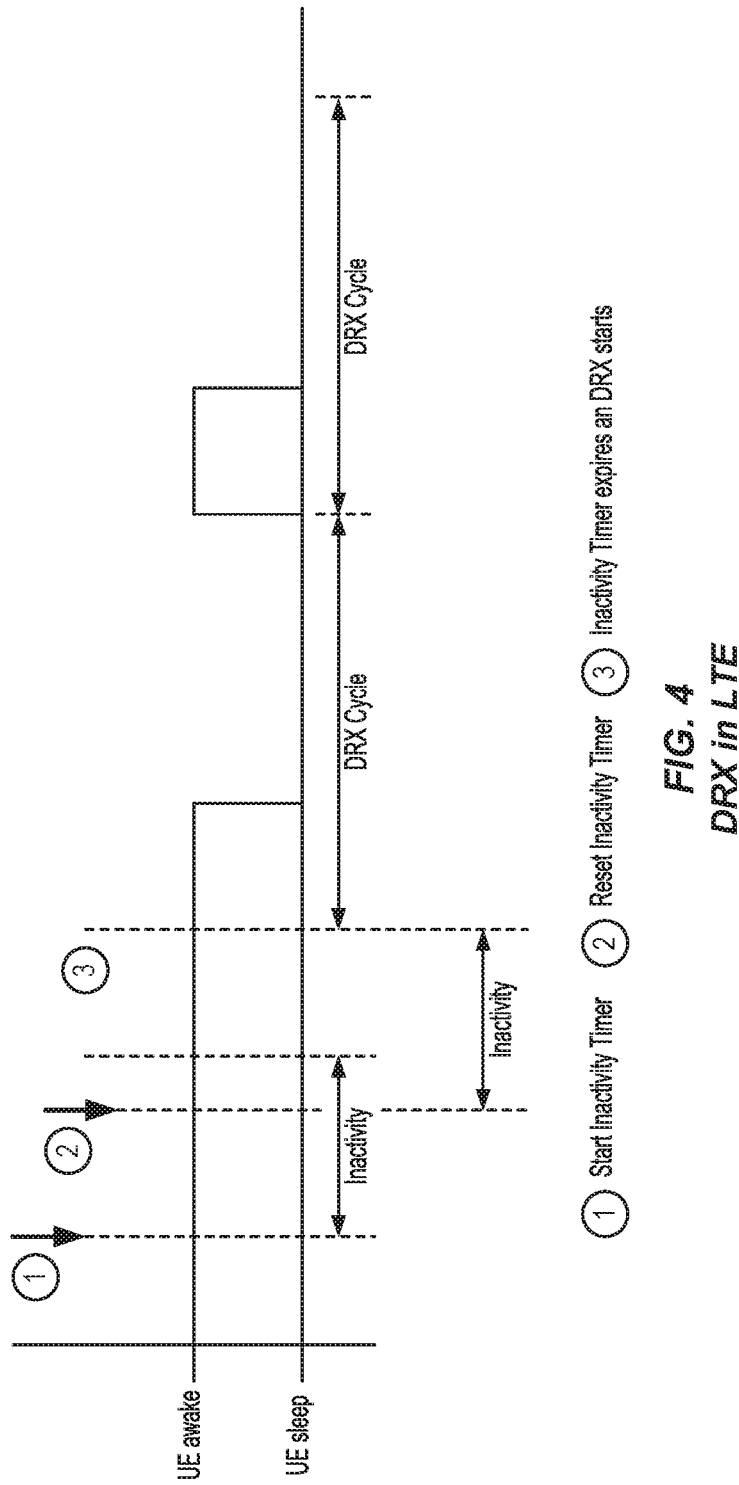
FIG. 4 illustrates Discontinuous Reception (DRX) in Long Term Evolution (LTE)

Herein, scenarios are assumed with at least one first and one second time interval, where the first time interval comprises longer discontinuous activity cycles (e.g., $T_{eDRX}$), and the second time interval comprises shorter discontinuous activity cycles (e.g., $T_{DRX}$), and where at least one of the below occurs:
  Scenario 1: One, some, or all ON DURATION periods of the second time interval are further comprised in one or more window periods of the first time interval (see, e.g., FIG. 1B or FIG. 2B, where ON DURATION periods and window periods are highlighted);
  Scenario 2: The first and the second time intervals are non-overlapping and one of:
    The first and the second time intervals are consecutive in time (in either order; see, e.g., FIG. 1A),
    The first and the second time intervals are non-consecutive in time (in either order);
  Scenario 3: The first and the second time intervals overlap, at least in part, or are configured in parallel.

In the above scenarios, the first and the second time periods correspond to the first and the second levels of a multi-level discontinuous activity configuration. More than two levels may also be envisioned.

In one example, a window size of the first time interval may comprise a hyper frame or a Paging Window (PW).

Embodiments of a Method of Operation of a UE to Adapt its Activity Under Multi-Level Discontinuous Activity Configuration According to this part of the disclosure, a UE (e.g., the UE 18) adapts its activity in scenarios described in the Multi-Level Discontinuous Activity Configuration section above.

Figure 6:
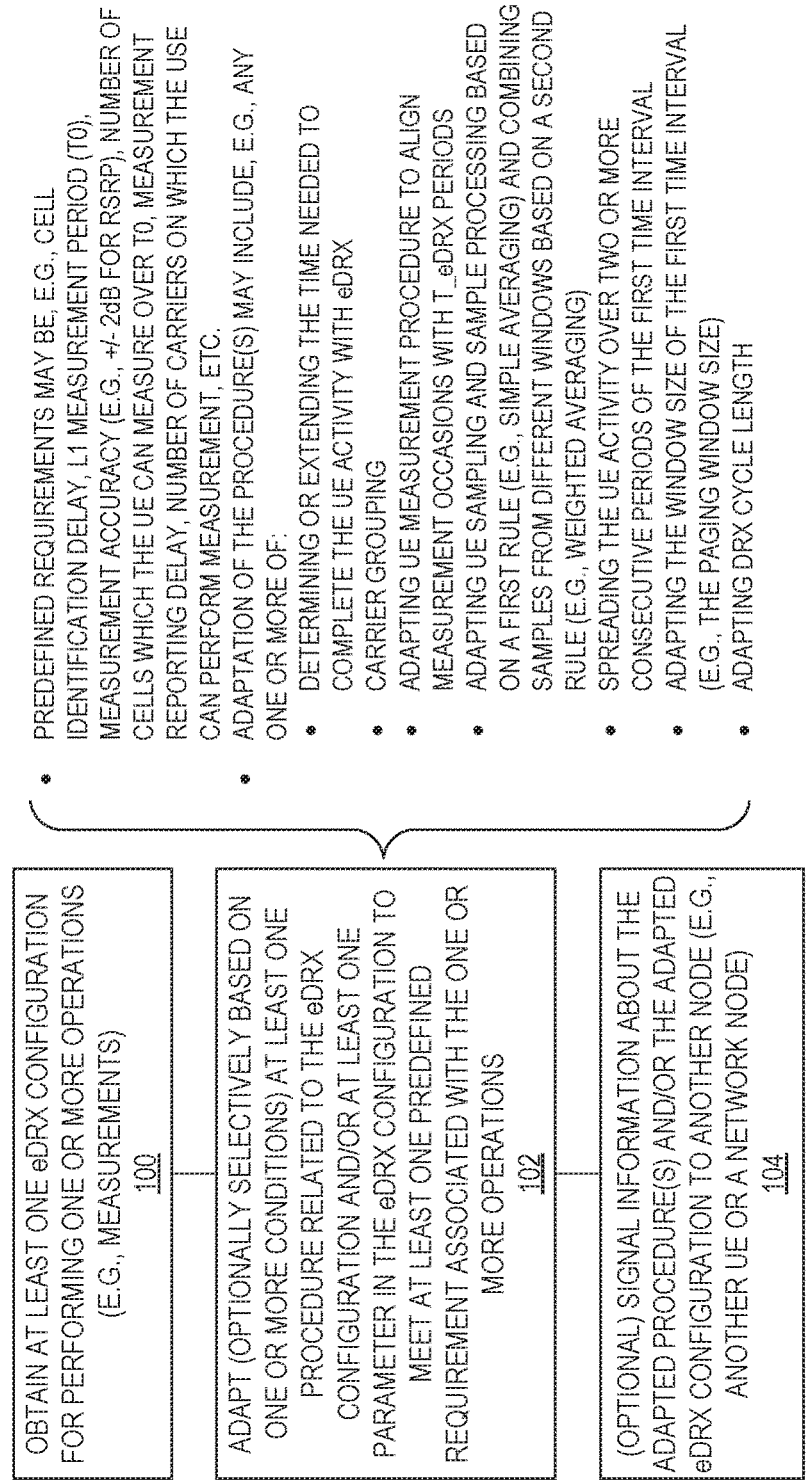
FIG. 6 is a flow chart that illustrates the operation of a User Equipment device (UE) according to some embodiments of the present disclosure.

As illustrated in FIG. 6, in some embodiments, the method of operation of a UE (e.g., the UE 18) comprises:
  obtaining at least one enhanced Discontinuous Reception (eDRX) configuration for performing one or more operations (e.g., measurements, etc.) (step 100);
  adapting at least one procedure related to eDRX configuration and/or at least one parameter in eDRX configuration to meet at least one predefined requirement associated with the one or more operations (step 102);
  (optional) signaling the information about the adapted procedure(s) and/or configuration to another UE or a network node (step 104).

Notably, while the term "step" is used herein with respect to various flow charts used to illustrate embodiments of the present disclosure, the term "step" is not to be construed as limiting the order in which the corresponding functions are performed. The "steps" may be performed in any desired order unless otherwise stated or required.

Examples of predefined requirements are cell identification delay; L1 measurement period (T0), aka physical layer measurement period or simply measurement period or measurement time, measurement accuracy (e.g. +/−2 Decibels (dB) for RSRP); number of cells which the UE can measure over T0; measurement reporting delay; number of carriers on which the UE can perform measurement; etc.

The adaptation of the procedure in the UE may comprise adapting the length of the measurement sample and/or the measurement sampling rate as a function of the eDRX cycle to ensure the UE meets one or more predefined requirements.

The adaptation may be based, e.g., on a predefined rule and/or controlled by another node.

In one embodiment, the adaptation may be performed or the new requirements for eDRX may apply when one or more conditions are met, e.g., any one or more of:
  threshold1$<t_{eDRX}$ and/or $t_{eDRX}<$threshold2,
  threshold3$<t_{eDRX}/t_{DRX}$ and/or $t_{eDRX}/t_{DRX}<$threshold4,
  threshold5$<T_{eDRX}$ and/or $T_{eDRX}<$threshold6,
  threshold7$<T_{eDRX}/T_{DRx}$ and/or $T_{eDRX}/T_{DRX}<$threshold8,
  $T_{OldReq}<=t_{eDRX}$
  threshold9$<T_{DRX}<$threshold10 and/or threshold11$<t_{DRX}<$threshold12
  $R_{threshold1}<$Number of DRX cycles (R) within $t_{eDRX}<R_{threshold2}$ where, as illustrated in, e.g., FIGS. 1A, 1B, 2A, and 2B, $t_{eDRX}$ is the length, or duration, of an eDRX occasion (which is also referred to herein as a PW), $t_{DRX}$ is a length, or duration, of a Discontinuous Reception (DRX) occasion, $T_{eDRX}$ is a length or an eDRX cycle, and $T_{DRX}$ is a length of a DRX cycle.

The adaptation may comprise, e.g., any one or more of:
  Determining or extending (e.g., compared to when eDRX is not configured) the time needed to complete the UE activity with eDRX, Example 1:
The new time required to complete an activity is extended from $T_{OldReq}$ to $T_{NewReq}$ as follows:

$$T_{NewReq} = \left\lceil \frac{T_{OldReq}}{t_{eDRX}} \right\rceil \cdot T_{eDRX} \text{ or}$$

$$T_{NewReq} = \begin{cases} \left\lfloor \frac{T_{OldReq}}{t_{eDRX}} \right\rfloor \cdot T_{eDRX} + \left\{ \frac{T_{OldReq}}{t_{eDRX}} \right\}, & \text{if } T_{OldReq} > t_{eDRX} \\ T_{OldReq}, & \text{if } T_{OldReq} \leq t_{eDRX} \end{cases}$$

where depending on the requirement, $T_{OldReq}$ may also be a function of the number of legacy DRX cycle length and the number of such DRX cycles (e.g., 5 DRX cycles in an old requirement may transform into 2 eDRX cycles). $T_{OldReq}$ may correspond to the time required to complete the UE activity when eDRX is not configured while DRX may or may not be configured. $T_{NewReq}$ may further be restricted by a certain limit, e.g., an absolute threshold $T_{max}$, which in turn may restrict the maximum number of eDRX cycles allowed for the UE activity (e.g., a measurement):

$$T_{NewReq} = \min(T_{NewReq}, T_{max})$$

Example 2: the new required time for completing a UE activity can be in general calculated by any one of the below:

$$T_{NewReq} = f(T_{eDRX}, T_{DRX})$$

$$T_{NewReq} = f(T_{eDRX}, T_{DRX}, t_{eDRX})$$

$$T_{NewReq} = f(T_{eDRX}, T_{DRX}, t_{eDRX}, t_{DRX})$$

$$T_{NewReq} = f(T_{OldReq}, t_{eDRX})$$

$$T_{NewReq} = f(T_{OldReq}, T_{eDRX})$$

carrier grouping, e.g., performing measurements on a first group of carrier frequencies in a first eDRX cycle and performing measurements on a second group of carrier frequencies in a second eDRX cycle;
Example:
In the existing inter-frequency requirements for cell reselection, the UE shall be able to evaluate whether a newly detectable inter-frequency cell in a normal performance group meets the reselection criteria defined in 3GPP TS 36.304 (version 12.6.0) within $K_{carrier,normal} * T_{detect,EUTRAN\_Inter}$, and is able to evaluate whether a newly detectable inter-frequency cell in reduced performance group meets the reselection criteria defined in 3GPP TS 36.304 (version 12.6.0) within $6 * K_{carrier,reduced} * T_{detect,EUTRAN\_Inter}$. With the adaptation, the grouping would be done for $K_{carrier,normal}$ or $K_{carrier,reduced}$ carriers, while evaluating N out of $K_{carrier,normal}$ or $K_{carrier,reduced}$ carriers in each eDRX cycle.

adapting UE measurement procedure to align measurement occasions with $T_{eDRX}$ periods
Example 1:
In the current requirements in 3GPP TS 36.133 (V13.0.0, 2015-07), the UE shall search every layer of higher priority at least every $T_{higher\_priority\_search} = (60 * N_{layers})$ seconds, where $N_{layers}$ is the total number of configured higher priority E-UTRA, Universal Terrestrial Radio Access (UTRA) Frequency Division Duplexing (FDD), UTRA Time Division Duplexing (TDD), Code Division Multiple Access 2000 (CDMA2000) 1× and High Rate Packed Data (HRPD) carrier frequencies and is additionally increased by one if one or more groups of GSM frequencies are configured as a higher priority. When the UE performs the adaptation, the search occasions have to be adapted to align with PWs and the search periodicity may be adapted to be a multiple of $T_{eDRX}$. In a further example, the UE may perform a search for N layers every PW ($1 <= N < N_{layers}$).

Example 2:
In yet another example, the UE may adapt the number of layers (N) to be searched as a function of the PW ($t_{eDRX}$). For example, example, a mapping between N and $t_{eDRX}$ can be predefined in the specification or the mapping can be signaled by the network node to the UE; N is larger for a larger value of $t_{eDRX}$ whereas N is smaller for a smaller value of $t_{eDRX}$.

Example 3:
The UE activity is performed when for this activity $T_{OldReq} <= t_{eDRX}$, otherwise dropped or restarted or performed in a best effort or at a reduced quality.

adapting UE sampling and sample processing (e.g., combining samples from one window based on a first rule (e.g., simple averaging) and combining samples from different windows based on a second rule (e.g., weighted averaging));

"spreading" the activity over two or more consecutive window periods of the first time interval
Example:
In the current requirements in 3GPP TS 36.133 (V13.0.0), the UE in RRC_IDLE searches and evaluates cells using the intra-frequency, inter-frequency, and inter-Radio Access Technology (RAT) information indicated in the system information for 10 seconds, after which the UE shall initiate cell selection procedures for the selected Public Land Mobile Network (PLMN). With the adaptation, depending on the PW length, the current maximum limit of 10 seconds for cell search and evaluation can be distributed over multiple consecutive PWs (when the PW is smaller than 10 seconds).

Adapting the window size of the first time interval (e.g., the PW size), e.g., based on a received configuration from another node or autonomously
Example 1:
The PW size is determined by the UE or increased (e.g., compared to when eDRX is not used) so that $t_{eDRX} >= T_{OldReq}$.
Example 2:
The UE is configured with a DRX cycle of 2.56 seconds and performing an activity requiring $T_{OlReq} = 5$ DRX cycles; then the UE is configured with eDRX, the UE autonomously determines or increases $t_{eDRX} >= 5*2.56$ seconds and completes the activity within $t_{eDRX}$.

Adapting DRX cycle length to ensure that the activity can be completed
Example:
The UE is configured with a DRX cycle of 2.56 seconds and performing an activity requiring $T_{OldReq} = 5$ DRX cycles; then the UE is configured with eDRX with $t_{eDRX} < 5*2.56$; the UE autonomously reduces the DRX cycle length to a length<2.56 seconds and completes the activity within $t_{eDRX}$.

In 3GPP LTE, with respect to cell reselection, the requirement for higher-priority search in 3GPP Release 12 and 13 is that "The UE shall search every layer of higher priority at least every $T_{higher\_priority\_search}=(60*N_{layers})$ seconds, where $N_{layers}$ is the total number of configured higher priority E-UTRA, UTRA FDD, UTRA TDD, CDMA2000 1× and HRPD carrier frequencies and is additionally increased by one if one or more groups of GSM frequencies is configured as a higher priority," as stated in, e.g., 3GPP TS 36.133 (V13.0.0), Section 4.2.2. In some embodiments, the adaptation (of step 102) includes adapting the search occasions to align with PWs. Further, in some embodiments, the search periodicity may be adapted to be a multiple of $T_{eDRX}$.

With respect to serving cell evaluation, the UE in RRC_IDLE searches and evaluations cells using the intra-frequency, inter-frequency, and inter-RAT information indicated in the system information for 10 seconds, after which the UE shall initiate cell reselection procedures for the selected PLMN. In some embodiments, depending on the PW length, the current maximum limit of 10 seconds for cell search and evaluation may be distributed over multiple consecutive PWs (when the PW is smaller than 10 seconds).

The evaluation of the serving cell is done is $N_{serv}$ consecutive DRX cycles as listed in Table 1 below:

TABLE 1

| Current $N_{serv}$ (36.133, Table 4.2.2.1-1) | |
|---|---|
| DRX cycle length [s] | $N_{serv}$ [number of DRX cycles] |
| 0.32 | 4 |
| 0.64 | 4 |
| 1.28 | 2 |
| 2.56 | 2 |

In some embodiments, the adaptation (of step 102) may include adapting the eDRX requirements such that $N_{serv}$ is 2 DRX cycles for all DRX cycle lengths, which should preferably be limited to 1 eDRX cycle.

In 3GPP LTE Release 13, intra-frequency measurements are as shown in Table 2 below.

TABLE 2

| $T_{detect,EUTRAN\_Intra}$, $T_{measure,EUTRAN\_Intra}$ and $T_{evaluate,E-UTRAN\_intra}$ (36.133, Table 4.2.2.3-1) | | | |
|---|---|---|---|
| DRX cycle length [s] | $T_{detect,EUTRAN\_Intra}$ [s] (number of DRX cycles) | $T_{measure,EUTRAN\_Intra}$ [s] (number of DRX cycles) | $T_{evaluate,E-UTRAN\_intra}$ [s] (number of DRX cycles) |
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

In some embodiments, the adaptation (step 102) may include adapting the intra-frequency measurement procedure such that the new eDRX requirements for intra-frequency measurements include:

$T_{measure,EUTRAN\_Intra}$ is 1 DRX cycle (i.e., 1 times the DRX cycle length $T_{DRX}$) for all DRX cycle lengths, and $T_{evaluate,EUTRAN\_Intra}$ is 3 DRX cycles (i.e., 3 times the DRX cycle length $T_{DRX}$) for all DRX cycle lengths, which should preferably be limited to 1 eDRX cycle.

In the inter-frequency requirements of 3GPP LTE Release 13, the UE shall be able to evaluate whether a newly detectable inter-frequency cell in normal performance group meets the reselection criteria defined in 3GPP TS 36.304 (V13.0.0) within $K_{carrier,normal}*T_{detect,EUTRAN\_Inter}$, and able to evaluate whether a newly detectable inter-frequency cell in reduced performance group meets the reselection criteria defined in TS 36.304 within $6*K_{carrier,reduced}*T_{detect,EUTRAN\_Inter}$. The currently specified $T_{detect,EUTRAN\_Inter}$, $T_{measure,EUTRAN\_Inter}$, and $T_{evaluate,E-UTRAN\_Inter}$ are as shown in Table 3 below.

TABLE 3

| $T_{detect,EUTRAN\_Inter}$, $T_{measure,EUTRAN\_Inter}$ and $T_{evaluate,E-UTRAN\_Inter}$ (36.133, Table 4.2.2.4-1) | | | |
|---|---|---|---|
| DRX cycle length [s] | $T_{detect,EUTRAN\_Inter}$ [s] (number of DRX cycles) | $T_{measure,EUTRAN\_Inter}$ [s] (number of DRX cycles) | $T_{evaluate,E-UTRAN\_Inter}$ [s] (number of DRX cycles) |
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

In some embodiments, the adaptation (step 102) may include adapting the inter-frequency measurement procedure such that the new eDRX requirements for inter-frequency measurements include:

$T_{measure,EUTRAN\_Inter}$ is 1 DRX cycle (i.e., 1 times the DRX cycle length $T_{DRX}$) for all DRX cycle lengths, and $T_{evaluate,EUTRAN\_Inter}$ is 3 DRX cycles (i.e., 3 times the DRX cycle length $T_{DRX}$) for all DRX cycle lengths, which should preferably be limited to 1 eDRX cycle.

The inter-RAT measurement requirements for 3GPP LTE Release 13 are illustrated in Tables 4 through 8 below.

TABLE 4

$T_{detectUTRA\_FDD}$, $T_{measureUTRA\_FDD}$, and $T_{evaluateUTRA\_FDD}$ (36.133, Table 4.2.2.5.1-1)

| DRX cycle length [s] | $T_{detectUTRA\_FDD}$ [s] | $T_{measureUTRA\_FDD}$ [s] (number of DRX cycles) | $T_{evaluateUTRA\_FDD}$ [s] (number of DRX cycles) |
|---|---|---|---|
| 0.32 | 30 | 5.12 (16) | 15.36 (48) |
| 0.64 |    | 5.12 (8)  | 15.36 (24) |
| 1.28 |    | 6.4 (5)   | 19.2 (15)  |
| 2.56 | 60 | 7.68 (3)  | 23.04 (9)  |

TABLE 5

$T_{detectUTRA\_TDD}$, $T_{measureUTRA\_TDD}$ and $T_{evaluateUTRA\_TDD}$ (36.133, Table 4.2.2.5.2-1)

| DRX cycle length [s] | $T_{detectUTRA\_TDD}$ [s] | $T_{measureUTRA\_TDD}$ [s] (number of DRX cycles) | $T_{evaluateUTRA\_TDD}$ [s] (number of DRX cycles) |
|---|---|---|---|
| 0.32 | 30 | 5.12 (16) | 15.36 (48) |
| 0.64 |    | 5.12 (8)  | 15.36 (24) |
| 1.28 |    | 6.4 (5)   | 19.2 (15)  |
| 2.56 | 60 | 7.68 (3)  | 23.04 (9)  |

TABLE 6

$T_{measure,GSM}$ (36.133, Table 4.2.2.5.3-1)

| DRX cycle length [s] | $T_{measure,GSM}$ [s] (number of DRX cycles) |
|---|---|
| 0.32 | 5.12 (16) |
| 0.64 | 5.12 (8)  |
| 1.28 | 6.4 (5)   |
| 2.56 | 7.68 (3)  |

TABLE 7

$T_{measureHRPD}$ and $T_{evaluateHRPD}$ (36.133, Table 4.2.2.5.4-1)

| DRX cycle length [s] | $T_{measureHRPD}$ [s] (number of DRX cycles) | $T_{evaluateHRPD}$ [s] (number of DRX cycles) |
|---|---|---|
| 0.32 | 5.12 (16) | 15.36 (48) |
| 0.64 | 5.12 (8)  | 15.36 (24) |
| 1.28 | 6.4 (5)   | 19.2 (15)  |
| 2.56 | 7.68 (3)  | 23.04 (9)  |

TABLE 8

$T_{measureCDMA2000\_1X}$ and $T_{evaluateCDMA2000\_1X}$ (36.133, Table 4.2.2.5.5-1)

| DRX cycle length [s] | $T_{measureCDMA2000\_1X}$ [s] (number of DRX cycles) | $T_{evaluateCDMA2000\_1X}$ [s] (number of DRX cycles) |
|---|---|---|
| 0.32 | 5.12 (16) | 15.36 (48) |
| 0.64 | 5.12 (8)  | 15.36 (24) |
| 1.28 | 6.4 (5)   | 19.2 (15)  |
| 2.56 | 7.68 (3)  | 23.04 (9)  |

In some embodiments, the adaptation (step 102) may include adapting the inter-RAT measurement procedure such that the new eDRX requirements for inter-RAT measurements include:

$T_{measure,*}$ is 3 DRX cycles (i.e., 3 times the DRX cycle length $T_{DRX}$) for all DRX cycle lengths where "$T_{measure,*}$" denotes any of $T_{measureUTRA\_FDD}$, $T_{measureUTRA\_TDD}$, $T_{measure,GSM}$, $T_{measureHRPD}$, and $T_{measureCDMA2000\_1x}$, and $T_{evaluate*}$ (for the RATs it exists already) is 9 DRX cycles (i.e., 9 times the DRX cycle length $T_{DRX}$) for all DRX cycle lengths, which should preferably be limited to 1 eDRX cycle.

Embodiments of a Method of Operation of a Network Node of Adapting Multi-Level Discontinuous Activity Configuration for One or More UE According to this part of the disclosure, a network node (e.g., the base station 14 or a node in the EPC 20) adaptively configures at least one parameter of a multi-level discontinuous activity configuration for one or more UEs (e.g., the UEs 18) in scenarios described in the Multi-Level Discontinuous Activity Configuration section above.

Figure 7:
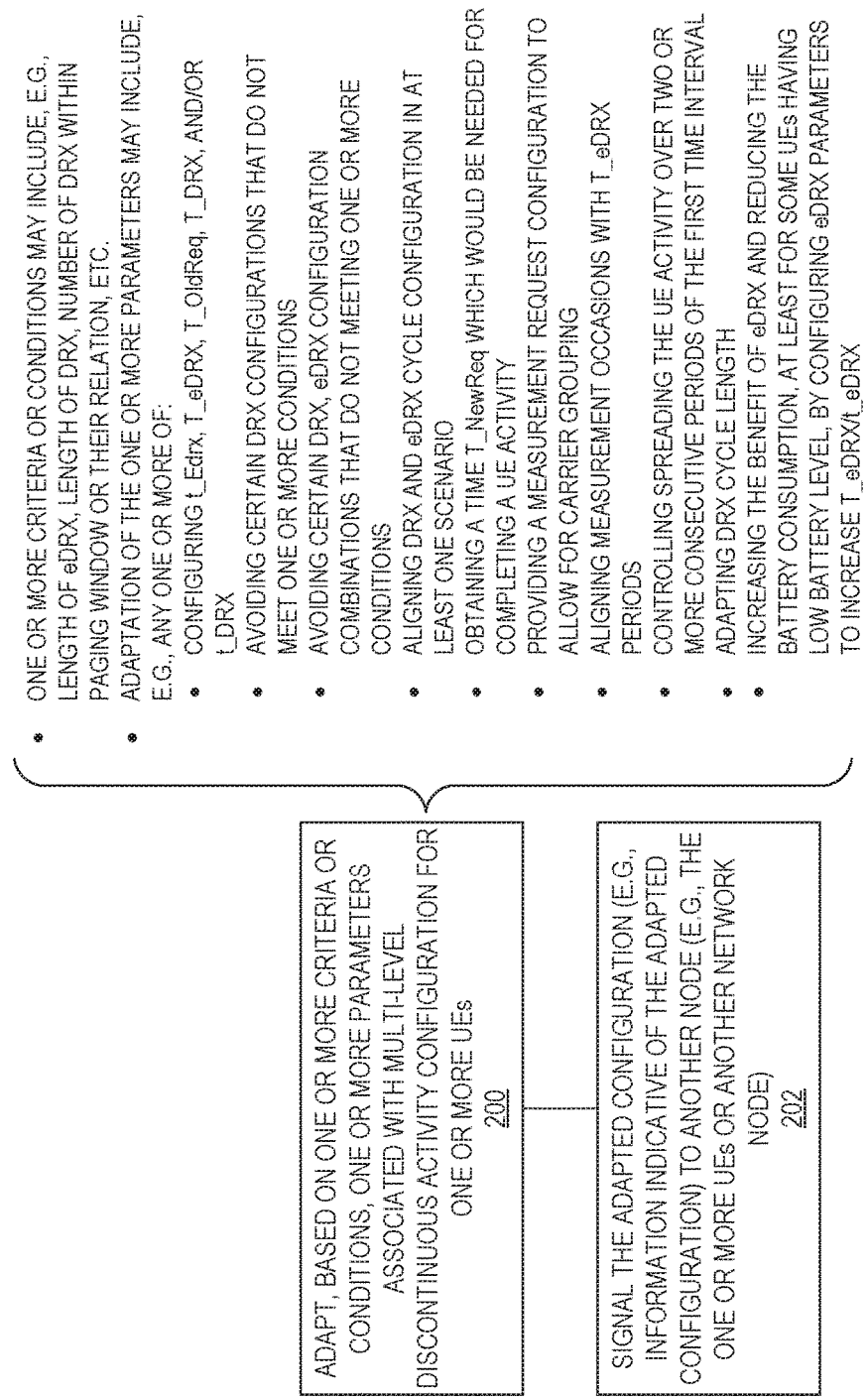
FIG. 7 is a flow chart that illustrates the operation of a network node according to some embodiments of the present disclosure.

As illustrated in FIG. 7, in some embodiments, the method of operation of a network node (e.g., a base station 14 or some other radio network node or core network node) comprises:

adapting based on one or more criteria or condition (e.g., length of eDRX, length of DRX, number of DRX within PW or their relation, etc.), one or more parameters associated with multi-level discontinuous activity configuration for one or more UEs (step 200); and signaling the adapted configuration to one or more UEs or a network node (step 202).

The adaptation may be based, e.g., on a predefined rule and/or controlled by another node.

In some embodiments, the adaptation may comprise, e.g., any one or more of:

configuring $t_{eDRX}$ so that: threshold1 $< t_{eDRX}$ and/or $t_{eDRX} <$ threshold2, configuring $t_{eDRX}$ and $t_{DRX}$ so that: threshold3 $< t_{eDRX}/t_{DRX}$ and/or $t_{eDRX}/t_{DRX} <$ threshold4, configuring $T_{eDRX}$ so that: threshold5 $< T_{eDRX}$ and/or $T_{eDRX} <$ threshold6, configuring $T_{eDRX}$ and $T_{DRX}$ so that: threshold7 $< T_{eDRX}/T_{DRX}$ and/or $T_{eDRX}/T_{DRX} <$ threshold8, configuring $T_{OldReq} \leq t_{eDRX}$, configuring $T_{DRX}$ so that: threshold9 $< T_{DRx} <$ threshold10, configuring $t_{DRx}$ so that: threshold11 $< t_{DRx} <$ threshold12.

The adaption may further comprise:

avoid certain DRX configurations that do not meet one or more conditions above, avoid certain (DRX, eDRX) configuration combinations that do not meet one or more conditions above, aligning DRX and eDRX cycle configuration in at least one scenario in the Multi-Level Discontinuous Activity Configuration section above, obtaining a time T_NewReq which would be needed for completing a UE activity, e.g., Example 1:
The new time required to complete an activity is extended from $T_{OldReq}$ to $T_{NewReq}$ as follows:

$$T_{NewReq} = \left\lceil \frac{T_{OldReq}}{t_{eDRX}} \right\rceil \cdot T_{eDRX} \text{ or}$$

$$T_{NewReq} = \begin{cases} \left\lfloor \frac{T_{OldReq}}{t_{eDRX}} \right\rfloor \cdot T_{eDRX} + \left\{ \frac{T_{OldReq}}{t_{eDRX}} \right\}, & \text{if } T_{OldReq} > t_{eDRX} \\ T_{OldReq}, & \text{if } T_{OldReq} \leq t_{eDRX} \end{cases}$$

where depending on the requirement $T_{OldReq}$ may also be a function of the number of legacy DRX cycle length and the number of such DRX cycles (e.g., 5 DRX cycles in an old requirement may transform into 2 eDRX cycles). $T_{OldReq}$ may correspond to the time required to complete the UE activity when eDRX is not configured while DRX may or may not be configured.

Example 2: the new required time for completing a UE activity can be in general calculated by any one of the below:

$T_{NewReq} = f(T_{eDRX}, T_{DRX})$ $T_{NewReq} = f(T_{eDRX}, T_{DRX}, t_{eDRX})$ $T_{NewReq} = f(T_{eDRX}, T_{DRX}, t_{eDRX}, t_{DRX})$ $T_{NewReq} = f(T_{OldReq}, t_{eDRX})$ $T_{NewReq} = f(T_{OldReq}, T_{eDRX})$

Measurement request configuration to allow for carrier grouping, e.g., UE performing measurements on a first group of carrier frequencies in a first eDRX cycle and performing measurements on a second group of carrier frequencies in a second eDRX cycle. The two groups of carrier frequencies may be associated with different measurement performances, which are to be met by the UE when performing measurement on these carriers, e.g. shorter measurement delay for measurement on the first group of carriers and longer measurement delay for the measurement on the second group of carriers. The first and the second group of carriers are also interchangeably called normal and reduced performance groups of carriers, respectively;

Example:
   In the existing inter-frequency requirements for cell reselection, the UE shall be able to evaluate whether a newly detectable inter-frequency cell in normal performance group meets the reselection criteria defined in 3GPP TS 36.304 within $K_{carrier,normal} * T_{detect,EUTRAN\_Inter}$, and able to evaluate whether a newly detectable inter-frequency cell in reduced performance group meets the reselection criteria defined in 3GPP TS 36.304 within $6 * K_{carrier,reduced} * T_{detect,EUTRAN\_Inter}$. With the adaptation, the grouping would be done for $K_{carrier,normal}$ or $K_{carrier,reduced}$ carriers, while evaluating N out of $K_{carrier,normal}$ or $K_{carrier,reduced}$ carriers in each eDRX cycle.

Align measurement occasions with $T_{eDRX}$ periods
Example 1:
   In the current requirements in 3GPP TS 36.133 (V13.0.0, 2015-07), the UE shall search every layer of higher priority at least every $T_{higher\_priority\_search} = (60 * N_{layers})$ seconds, where $N_{layers}$ is the total number of configured higher priority E-UTRA, UTRA FDD, UTRA TDD, CDMA2000 1x, and HRPD carrier frequencies and is additionally increased by one if one or more groups of GSM frequencies is configured as a higher priority. With the adaptation, the search occasions have to be adapted to align with PWs and the search periodicity may be adapted to be a multiple of $T_{eDRX}$. In a further example, the UE may perform search for N layers every PW ($1 <= N < N_{layers}$).

Controlling "spreading" the UE activity over two or more consecutive window periods of the first time interval. In some examples, the activity (e.g., a measurement) may be configured to be limited to N (N=1, . . . ) eDRX cycles.

Adapting DRX cycle length to ensure that the activity can be completed
   Example:
      UE is configured with DRX cycle of 2.56 seconds and performing an activity requiring $T_{OldReq}=5$ DRX cycles; then the UE is configured with eDRX with $t_{eDRX} < 5*2.56$; configure the UE to reduces the DRX cycle length to a length<2.56 seconds to enable the UE to complete the activity within $t_{eDRX}$.

Increasing the benefit of eDRX and reducing the battery consumption, at least for some UEs having low battery level, by configuring eDRX parameters to increase $T_{eDRX}/t_{eDRX}$.

Figure 8:
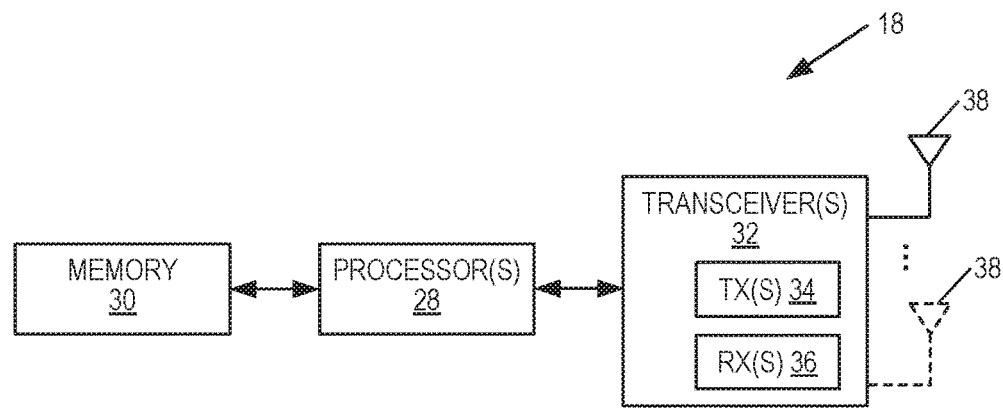
FIG. 8 is a block diagram of a UE according to some embodiments of the present disclosure.

FIG. 8 is a block diagram of the UE 18 according to some embodiments of the present disclosure. As illustrated, the UE 18 includes one or more processors 28 (e.g., one or more Central Processing Units (CPUs), one or more Application Specific Integrated Circuits (ASICs), one or more Field Programmable Gate Arrays (FPGAs), or the like, or any combination thereof), memory 30, and one or more transceivers 32 including one or more transmitters 34 and one or more receivers 36 coupled to one or more antennas 38. In some embodiments, the functionality of the UE 18 described herein is implemented in software, which is stored in the memory 30 and executed by the processor(s) 28.

In some embodiments, a computer program including instructions which, when executed by at least one processor, causes the at least one processor to carry out the functionality of the UE 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 30).

Figure 9:
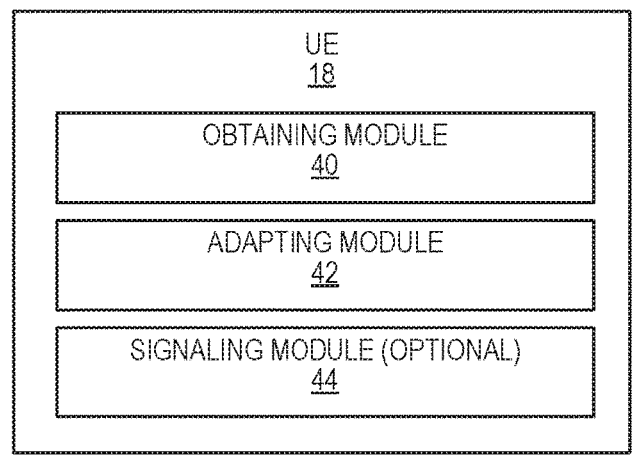
FIG. 9 is a block diagram of a UE according to some other embodiments of the present disclosure.

FIG. 9 is a block diagram of the UE 18 according to some other embodiments of the present disclosure. As illustrated, the UE 18 includes an obtaining module 40, an adapting module 42, and an optional signaling module 44, each of which is implemented in software. The obtaining module 40 operates to obtain at least one eDRX configuration for performing one or more operations, as described above. The adapting module 42 operates to adapt at least one procedure related to the eDRX configuration and/or at least one parameter in the eDRX configuration, e.g., to meet at least one predefined requirement associated with the one or more operations. Lastly, the signaling module 44 is optional and, in some embodiments, operates to signal (via an appropriate communication interface of the UE 18, which is not shown) information about the adapted procedure(s) and/or the adapted eDRX configuration to another node (e.g., another UE 18 or a network node).

Figure 10:
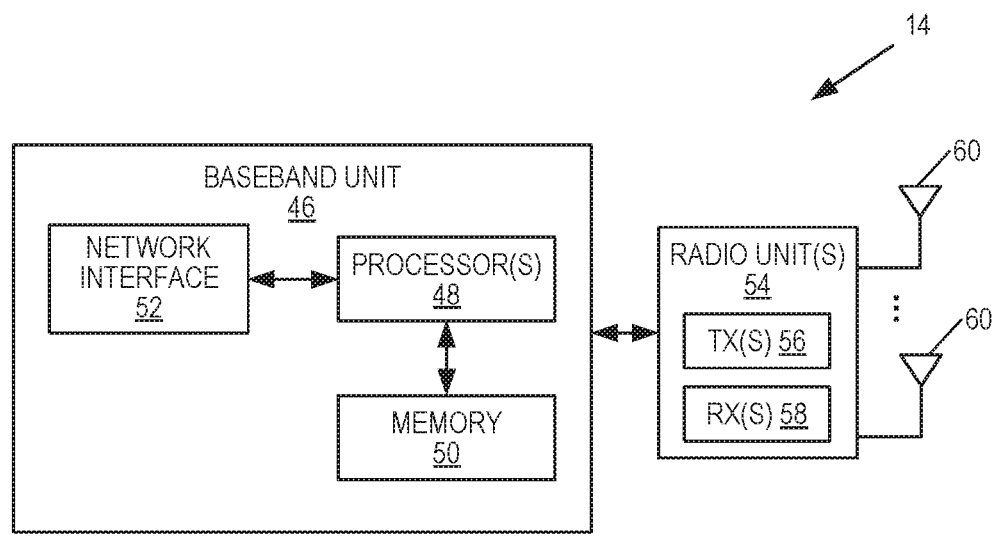
FIG. 10 is a block diagram of a network node according to some embodiments of the present disclosure.

FIG. 10 is a block diagram of the base station 14 according to some embodiments of the present disclosure. As illustrated, the base station 14 includes a baseband unit 46 that includes one or more processors 48 (e.g., one or more CPUs, one or more ASICs, one or more FPGAs, and/or the like, or any combination thereof), memory 50, and a network interface 52 (e.g., a network interface providing a connection to the core network 20 and/or other base stations 14). The base station 14 also includes one or more radio units 54 including one or more transmitters 56 and one or more receivers 58 connected to one or more antennas 60. In some embodiments, the functionality of the network node described herein is implemented in software, which is stored in the memory 50 and executed by the processor(s) 48.

Note that other network nodes may include components similar to those of the baseband unit 46 illustrated in FIG. 10.

In some embodiments, a computer program including instructions which, when executed by at least one processor, causes the at least one processor to carry out the functionality of the network node (e.g., the base station 14) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 11:
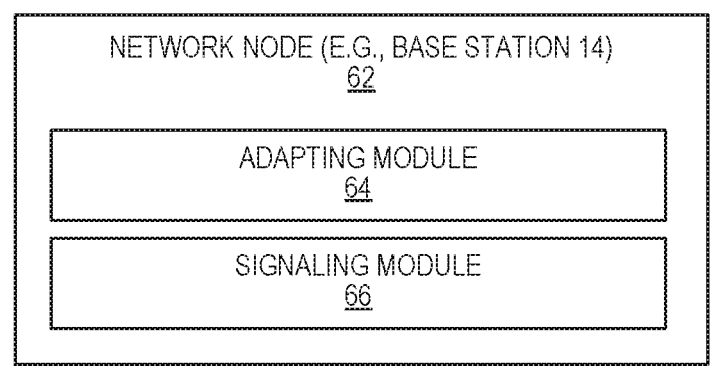
FIG. 11 is a block diagram of a network node according to some embodiments of the present disclosure.

FIG. 11 is a block diagram of a network node 62 (e.g., the base station 14) according to some other embodiments of the present disclosure. As illustrated, the network node 62 includes an adapting module 64 and a signaling module 66, each of which is implemented in software. The adapting module 64 operates to adapt, based on one or more criteria or conditions, one or more parameters associated with multi-level discontinuous activity configuration for one or more UEs 18, as described above. The signaling module 66 operates to signal (e.g., via an appropriate interface of the network node 62, which is not shown) the adapted configuration to another node (e.g., the one or more UEs 18 and/or another network node), as described above.

While various embodiments are described herein, some exemplary embodiments are as follows.

Embodiment 1: A method of operation of a User Equipment device, UE, (18) for adapting activity of the UE (18) under multi-level discontinuous activity configuration, comprising:

obtaining (100) at least one enhanced Discontinuous Reception, eDRX, configuration for performing one or more operations; and adapting (102) at least one procedure related to the eDRX configuration and/or at least one parameter in the eDRX configuration.

Embodiment 2: The method of embodiment 1 wherein adapting (102) the at least one procedure related to the eDRX configuration and/or the at least one parameter in the eDRX configuration comprises adapting (102) the at least one procedure related to the eDRX configuration and/or the at least one parameter in the eDRX configuration such that at least one predefined requirement associated with the one or more operations is satisfied.

Embodiment 3: The method of embodiment 2 wherein the at least one predefined requirement comprise at least one of: a cell identification delay, a physical layer measurement period, a measurement accuracy, a number of cells which the UE (18) can measure over the physical layer measurement period, a measurement reporting delay, and a number of carriers on which the UE (18) can perform measurement.

Embodiment 4: The method of any of embodiments 1-3 wherein the one or more operations comprise a measurement, and adapting (102) the at least one procedure related to the eDRX configuration and/or the at least one parameter in the eDRX configuration comprises adapting (102) a length of a measurement sample for the measurement and/or a measurement sampling rate for the measurement as a function of eDRX cycle.

Embodiment 5: The method of any of embodiments 1-4 wherein adapting (102) the at least one procedure related to the eDRX configuration and/or the at least one parameter in the eDRX configuration comprises adapting (102) the at least one procedure related to the eDRX configuration and/or the at least one parameter in the eDRX configuration based on at least one of a predefined rule and control information from another node.

Embodiment 6: The method of any of embodiments 1-5 wherein adapting (102) the at least one procedure related to the eDRX configuration and/or the at least one parameter in the eDRX configuration comprises selectively adapting (102) the at least one procedure related to the eDRX configuration and/or the at least one parameter in the eDRX configuration upon determining that one or more predefined conditions are satisfied.

Embodiment 7: The method of any of embodiments 1-6 wherein adapting (102) the at least one procedure related to the eDRX configuration and/or the at least one parameter in the eDRX configuration comprises determining or extending an amount of time needed to complete the one or more operations with eDRX.

Embodiment 8: The method of any of embodiments 1-6 wherein adapting (102) the at least one procedure related to the eDRX configuration and/or the at least one parameter in the eDRX configuration comprises providing carrier grouping such that the one or more operations are performed on a first group of carrier frequencies in a first eDRX cycle and the one or more operations are performed on a second group of carrier frequencies in a second eDRX cycle.

Embodiment 9: The method of any of embodiments 1-6 wherein adapting (102) the at least one procedure related to the eDRX configuration and/or the at least one parameter in the eDRX configuration comprises adapting a UE measurement procedure such that measurement occasions are aligned with $T_{eDRX}$ periods.

Embodiment 10: The method of any of embodiments 1-6 wherein adapting (102) the at least one procedure related to the eDRX configuration and/or the at least one parameter in the eDRX configuration comprises adapting UE sampling and sample processing.

Embodiment 11: The method of any of embodiments 1-6 wherein the multi-level discontinuous activity configuration comprises at least one first and one second time intervals where the first time interval comprises longer discontinuous activity cycles and the second time interval comprises shorter discontinuous activity cycles, and adapting (102) the at least one procedure related to the eDRX configuration and/or the at least one parameter in the eDRX configuration comprises spreading the one or more operations over two or more consecutive window periods of the first time interval.

Embodiment 12: The method of any of embodiments 1-6 wherein the multi-level discontinuous activity configuration comprises at least one first and one second time intervals where the first time interval comprises longer discontinuous activity cycles and the second time interval comprises shorter discontinuous activity cycles, and adapting (102) the at least one procedure related to the eDRX configuration and/or the at least one parameter in the eDRX configuration comprises adapting the window size of the first time interval.

Embodiment 13: The method of any of embodiments 1-6 wherein adapting (102) the at least one procedure related to the eDRX configuration and/or the at least one parameter in the eDRX configuration comprises adapting DRX cycle length.

Embodiment 14: A method of operation of a network node for adapting multi-level discontinuous activity configuration for one or more User Equipment devices, UEs, (18) comprising:

adapting (200), based on one or more criteria or conditions, one or more parameters associated with multi-level discontinuous activity configuration for one or more UEs (18); and signaling (202) the adapted multi-level discontinuous activity configuration to the one or more UEs (18) or another network node.

Embodiment 15: The method of embodiment 14 wherein adapting (200) the one or more parameters comprises configuring at least one of: $t_{eDRX}$, $t_{DRX}$, $T_{eDRX}$, and $T_{DRX}$ such that one or more conditions are satisfied.

Embodiment 16: The method of any of embodiments 14-15 wherein adapting (200) the one or more parameters comprises avoiding certain Discontinuous Reception, DRX, configurations that do not satisfy one or more conditions.

Embodiment 17: The method of any of embodiments 14-15 wherein adapting (200) the one or more parameters comprises avoiding certain DRX, eDRX configuration combinations that do not satisfy one or more conditions.

Embodiment 18: The method of any of embodiments 14-17 wherein adapting (200) the one or more parameters comprises aligning DRX and eDRX cycle configuration.

Embodiment 19: The method of any of embodiments 14-17 wherein adapting (200) the one or more parameters comprises obtaining an amount of time needed for completing a UE activity associated with the multi-level discontinuous activity configuration.

Embodiment 20: The method of embodiment 19 wherein obtaining the amount of time needed for completing the UE activity associated with the multi-level discontinuous activity configuration comprises extending an existing amount of time needed for completion of the UE activity.

Embodiment 21: The method of any of embodiments 14-17 wherein adapting (200) the one or more parameters comprises providing a measurement request configuration to allow for carrier grouping whereby measurements are performed by the one or more UEs (18) on a first group of carrier frequencies in a first eDRX cycle and measurements are performed by the one or more UEs (18) on a second group of carrier frequencies in a second eDRX cycle.

Embodiment 22: The method of any of embodiments 14-17 wherein adapting (200) the one or more parameters comprises aligning measurement occasions with $T_{eDRX}$ periods.

Embodiment 23: The method of any of embodiments 14-17 wherein the multi-level discontinuous activity configuration comprises at least one first and one second time intervals where the first time interval comprises longer discontinuous activity cycles and the second time interval comprises shorter discontinuous activity cycles, and adapting (200) the one or more parameters comprises controlling spreading of UE activity over two or more consecutive window periods of the first time interval.

Embodiment 24: The method of any of embodiments 14-17 wherein adapting (200) the one or more parameters comprises adapting eDRX parameters to increase $T_{eDRX}/t_{eDRX}$.

The following acronyms are used throughout this disclosure.

2G 2$^{nd}$ Generation
3G 3$^{rd}$ Generation
3GPP 3$^{rd}$ Generation Partnership Project
ACK Acknowledgement
ASIC Application Specific Integrated Circuit
CA Carrier Aggregation
CC Component Carrier
CDMA Code Division Multiple Access
CGI Cell Global Identification
CPE Customer Premises Equipment
CPICH Common Pilot Channel
CPU Central Processing Unit
CQI Channel Quality Index
C-RNTI Cell Radio Network Temporary Identifier
CRS Cell-Specific Reference Signal
CSI-RS Channel State Information Reference Signal
D2D Device to Device
dB Decibel
DRS Discovery Reference Signal
DRX Discontinuous Reception
ECGI Evolved Universal Terrestrial Radio Access Cell Global Identification
eDRX Enhanced Discontinuous Reception
eNB Enhanced or Evolved Node B
EPC Evolved Packet Core
E-PDCCH Enhanced Physical Downlink Control Channel
E-UTRA Evolved Universal Terrestrial Radio Access
E-UTRAN Evolved Universal Terrestrial Radio Access Network
FDD Frequency Division Duplexing
FPGA Field Programmable Gate Array
GSM Global System for Mobile Communications
HARQ Hybrid Automatic Repeat Request
HRPD High Rate Packed Data
H-SFN Hyper System Frame Number
HSPA High Speed Packet Access
IDC In-Device Coexistence
LEE Laptop Embedded Equipment
LME Laptop Mounted Equipment
LTE Long Term Evolution
M2M Machine to Machine
MAC Medium Access Control
MBMS Multimedia Broadcast/Multicast Service
MCE Multi-Cell/Multicast Coordination Entity
MDT Minimization of Drive Tests
MME Mobility Management Entity
M-PDCCH Machine Type Communication Physical Downlink Control Channel
M-PDSCH Machine Type Communication Physical Downlink Shared Channel
MTC Machine Type Communication
NACK Negative Acknowledgement
PCC Primary Component Carrier
PCell Primary Cell
PDCCH Physical Downlink Control Channel
PDN Packet Data Network
PDSCH Physical Downlink Shared Channel
P-GW Packet Data Network Gateway
PH Paging Hyper-Frame
PLMN Public Land Mobile Network
PMI Precoding Matrix Indicator PS Packet-Switched
PSC Primary Serving Cell
PSS Primary Synchronization Signal
PTI Procedure Transaction Identity
PTW Paging Transmission Window
PUCCH Physical Uplink Control Channel
PW Paging Window
RAN Radio Access Network
RAT Radio Access Technology
RI Rank Indicator
RLM Radio Link Monitoring
RRC Radio Resource Control
RRH Remote Radio Head
RRU Remote Radio Unit
RS Reference Signal
RSCP Received Signal Code Power
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SFN System Frame Number
S-GW Serving Gateway
SINR Signal to Interference plus Noise Ratio
SNR Signal to Noise Ratio
SRS Sounding Reference Signal
SSC Secondary Serving Cell
SSS Secondary Synchronization Signal
TCE Trace Collection Entity
TDD Time Division Duplexing
TS Technical Specification
UE User Equipment
UMTS Universal Mobile Telecommunications System
USB Universal Serial Bus
UTRA Universal Terrestrial Radio Access Those skilled in the art will recognize improvements and modifications to the embodiments of the present disclosure. All such improvements and modifications are considered within the scope of the concepts disclosed herein.

What is claimed is:

1. A method of operation of a User Equipment device, UE, for adapting activity of the UE under multi-level discontinuous activity configuration, wherein the multi-level discontinuous activity configuration is associated with a first level and a second level of discontinuous activity configuration, the method comprising:

obtaining a configuration of the first level of a multi-level discontinuous activity, wherein the first level of the multi-level discontinuous activity configuration is associated with a first discontinuous activity cycle that is longer than a second discontinuous activity cycle associated with the second level of the multi-level discontinuous activity; and adapting at least one procedure related to the configuration of the first level of the multilevel discontinuous activity, wherein adapting the at least one procedure related to the configuration of the first level of the multi-level discontinuous activity comprises at least one of:

adapting an inter-frequency or intra-frequency measurement procedure such that a measurement requirement for the inter-frequency or intra-frequency measurement procedure is equal to 1 times a second cycle length for the second level of the multi-level discontinuous activity configured for the UE for any cycle length in a predefined set of cycle lengths for the second level of the multi-level discontinuous activity; and adapting an inter-Radio Access Technology, RAT, measurement procedure such that a measurement requirement for the inter-RAT measurement procedure is equal to 3 times a second cycle length for the second level of the multi-level discontinuous activity configured for the UE for any cycle length in a predefined set of cycle lengths for the second level of the multi-level discontinuous activity.

2. The method of claim 1 wherein the multi-level discontinuous activity configuration comprises at least one first time interval and at least one second time interval, where the at least one first time interval comprises one or more of the first discontinuous activity cycles, the at least one second time interval comprises one or more of the second discontinuous activity cycles, and the one or more of the first discontinuous activity cycles are longer than the one or more of the second discontinuous activity cycles.

3. The method of claim 1 wherein adapting the at least one procedure related to the configuration of the first level of the multi-level discontinuous activity further comprises adapting at least one parameter in the configuration of the first level of the multi-level discontinuous activity.

4. The method of claim 1 wherein the configuration of the first level of the multi-level discontinuous activity comprises a first cycle length for the first level of the multi-level discontinuous activity, the one or more operations comprise a measurement, and adapting the at least one procedure related to the configuration of the first level of the multi-level discontinuous activity and/or the at least one parameter in the configuration of the first level of the multi-level discontinuous activity comprises adapting a length of a measurement sample for the measurement and/or a measurement sampling rate for the measurement as a function of the first cycle length for the first level of the multi-level discontinuous activity.

5. The method of claim 4 wherein adapting the length of the measurement sample for the measurement and/or the measurement sampling rate for the measurement as a function of the first cycle length of the first level of the multi-level discontinuous activity comprises adapting the length of the measurement sample for the measurement as a function of the first cycle length for the first level of the multi-level discontinuous activity.

6. The method of claim 1 wherein adapting the at least one procedure related to the configuration of the first level of the multi-level discontinuous activity and/or the at least one parameter in the configuration of the first level of the multi-level discontinuous activity comprises adapting the at least one procedure related to the configuration of the first level of the multi-level discontinuous activity and/or the at least one parameter in the configuration of the first level of the multi-level discontinuous activity based on at least one of a predefined rule and control information from another node.

7. The method of claim 1 wherein adapting the at least one procedure related to the configuration of the first level of the multi-level discontinuous activity and/or the at least one parameter in the configuration of the first level of the multi-level discontinuous activity comprises determining or extending an amount of time needed to complete the one or more operations with the first level of the multi-level discontinuous activity.

8. The method of claim 1 wherein adapting the at least one procedure related to the configuration of the first level of the multi-level discontinuous activity and/or the at least one parameter in the configuration of the first level of the multi-level discontinuous activity comprises determining an amount of time needed to complete the one or more operations with the first level of the multi-level discontinuous activity.

9. The method of claim 8 wherein the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity and a second cycle length for the second level of the multi-level discontinuous activity configured for the UE.

10. The method of claim 8 wherein the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity, a second cycle length for the second level of the multi-level discontinuous activity configured for the UE, and a paging window of the first cycle length for the first level of the multi-level discontinuous activity configured for the UE.

11. The method of claim 8 wherein the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity, a second cycle length for the second level of the multi-level discontinuous activity configured for the UE, a first paging window of the first cycle length for the first level of the multi-level discontinuous activity configured for the UE, and a second paging window of the second cycle length for the second level of the multi-level discontinuous activity configured for the UE.

12. The method of claim 1 wherein the predefined set of cycle lengths comprises: 0.32 seconds, 0.64 seconds, 1.28 seconds, and 2.56 seconds.

13. The method of claim 1 wherein the intra-frequency measurement procedure is an IDLE mode measurement procedure.

14. A User Equipment device, LT, for a cellular communications network, comprising:
   at least one transceiver;
   at least one processor; and
   memory storing instructions executable by the at least one processor whereby the UE is operable to, in order to adapt activity of the UE under multi-level discontinuous activity configuration, wherein the multi-level discontinuous activity configuration is associated with a first level and a second level of discontinuous activity configuration:
   obtain a configuration of the first level of a multi-level discontinuous activity, wherein the first level of the multi-level discontinuous activity configuration is associated with a first discontinuous activity cycle that is longer than a second discontinuous activity cycle associated with the second level of the multi-level discontinuous activity; and
   adapt at least one procedure related to the configuration of the first level of the multi-level discontinuous activity,
   wherein adapting the at least one procedure related to the configuration of the first level of the multi-level discontinuous activity comprises at least one of:
   adapting an inter-frequency or intra-frequency measurement procedure such that a measurement requirement for the inter-frequency or intra-frequency measurement procedure is equal to 1 times a second cycle length for the second level of the multi-level discontinuous activity configured for the UE for any cycle length in a predefined set of cycle lengths for the second level of the multi-level discontinuous activity: and
   adapting an inter-Radio Access Technology, RAT, measurement procedure such that a measurement requirement for the inter-R-AT measurement procedure is equal to 3 times a second cycle length for the second level of the multi-level discontinuous activity configured for the UE for any cycle length in a predefined set of cycle lengths for the second level of the multi-level discontinuous activity.

15. The UE of claim 14 wherein the configuration of the first level of the multi-level discontinuous activity comprises a first cycle length for the first level of the multi-level discontinuous activity, the one or more operations comprise a measurement, and, in order to adapt the at least one procedure related to the configuration of the first level of the multilevel discontinuous activity, the UE is operable to adapt a length of a measurement sample for the measurement and/or a measurement sampling rate for the measurement as a function of the first cycle length of the first level of the multi-level discontinuous activity.

16. The UE of claim 15 wherein, via execution of the instructions by the at least one processor, the UE is operable to adapt the length of the measurement sample for the measurement as a function of the first cycle length of the first level of the multi-level discontinuous activity.

17. The UE of claim 14 wherein, in order to adapt the at least one procedure related to the configuration of the first level of the multi-level discontinuous activity and/or the at least one parameter in the configuration of the first level of the multi-level discontinuous activity, the UE is operable to adapt the at least one procedure related to the configuration of the first level of the multi-level discontinuous activity and/or the at least one parameter in the configuration of the first level of the multi-level discontinuous activity based on at least one of a predefined rule and control information from another node.

18. The UE of claim 14 wherein adaption of the at least one procedure related to the configuration of the first level of the multi-level discontinuous activity and/or the at least one parameter in the configuration of the first level of the multi-level discontinuous activity comprises determination of or extension of an amount of time needed to complete the one or more operations with the first level of the multi-level discontinuous activity.

19. The UE of claim 14 wherein adaptation of the at least one procedure related to the configuration of the first level of the multi-level discontinuous activity and/or the at least one parameter in the configuration of the first level of the multi-level discontinuous activity comprises determination of an amount of time needed to complete the one or more operations with the first level of the multi-level discontinuous activity.

20. The UE of claim 19 wherein the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity and a second cycle length for the second level of the multi-level discontinuous activity configured for the UE.

21. The UE of claim 19 wherein the configuration of the first level of the multi-level discontinuous activity comprises a first cycle length for the first level of the multi-level discontinuous activity, and the amount of time needed to complete the one or more operations with the first level of the multi-level discontinuous activity is a function of the first cycle length for the first level of the multi-level discontinuous activity, a second cycle length for the second level of the multi-level discontinuous activity configured for the UE, and paging window configured for the UE.

22. The UE of claim 14 wherein the predefined set of cycle lengths comprises: 0.32 seconds, 0.64 seconds, 1.28 seconds, and 2.56 seconds.

23. The UE of claim 14 wherein the intra-frequency measurement procedure is an IDLE mode measurement procedure.

24. A method of operation of a network node for adapting multi-level discontinuous activity configuration for one or more User Equipment devices, UEs, wherein the multi-level discontinuous activity configuration is associated with a first level and a second level of discontinuous activity configuration, the method comprising:
  adapting, based on one or more criteria or conditions, one or more parameters associated with multi-level discontinuous activity configuration for the one or more UEs such that at least one procedure related to the configuration of the first level of the multi-level discontinuous activity is adapted: and
  signaling the adapted multi-level discontinuous activity configuration to the one or more UEs or another network node,
  wherein adapting the one or more parameters associated with multi-level discontinuous activity configuration comprises at least one of:
  adapting an inter-frequency or intra-frequency measurement procedure such that a measurement requirement for the inter-frequency or intra-frequency measurement procedure is equal to 1 times a second cycle length for the second level of the multi-level discontinuous activity configured for the UE for any cycle length in a predefined set of cycle lengths for the second level of the multi-level discontinuous activity: and
  adapting an inter-Radio Access Technology, RAT, measurement procedure such that a measurement requirement for the inter-RAT measurement procedure is equal to times a second cycle length for the second level of the multi-level discontinuous activity configured for the UE for any cycle length in a predefined set of cycle lengths for the second level of the multi-level discontinuous activity.

25. The method of claim 24 wherein the multi-level discontinuous activity configuration comprises at least one first time interval and at least one second time interval, where the at least one first time interval comprises one or more of the first discontinuous activity cycles, the at least one second time interval comprises one or more of the second discontinuous activity cycles, and the one or more of the first discontinuous activity cycles are longer than the one or more of the second discontinuous activity cycles.

26. The method of claim 24 wherein adapting the one or more parameters comprises aligning DRX and eDRX cycle configuration.

27. The method of claim 24 wherein adapting the one or more parameters comprises providing a measurement request configuration to allow for carrier grouping whereby measurements are performed by the one or more UEs on a first group of carrier frequencies in a first eDRX cycle and measurements are performed by the one or more UEs on a second group of carrier frequencies in a second eDRX cycle.

28. The method of claim 24 wherein the multi-level discontinuous activity configuration comprises at least one first and one second time intervals where the at least one first time interval comprises one or more of the first discontinuous activity cycles and the second time interval comprises one or more of the second discontinuous activity cycles that are shorter than the one or more of the first discontinuous activity cycles, and adapting the one or more parameters comprises controlling spreading of UE activity over two or more consecutive window periods of the at least one first time interval.

29. A network node for adapting multi-level discontinuous activity configuration for one or more User Equipment devices, UEs, wherein the multi-level discontinuous activity configuration is associated with a first level and a second level of discontinuous activity configuration, the network node comprising:
  at least one processor: and
  memory storing instructions executable by the at least one processor whereby the network node is operable to:
    adapt, based on one or more criteria or conditions, one or more parameters associated with multi-level discontinuous activity configuration for the one or more UEs such that at least one procedure related to the configuration of the first level of the multi-level discontinuous activity is adapted; and
    signal the adapted multi-level discontinuous activity configuration to the one or more UEs or another network node,
    wherein adapting the one or more parameters associated with multi-level discontinuous activity configuration comprises at least one of:
    adapting an inter-frequency or intra-frequency measurement procedure such that a measurement requirement for the inter-frequency or intra-frequency measurement procedure is equal to 1 times a second cycle length for the second level of the multi-level discontinuous activity configured for the UE for any cycle length in a predefined set of cycle lengths for the second level of the multi-level discontinuous activity; and
    adapting an inter-Radio Access Technology, RAT, measurement procedure such that a measurement requirement for the inter-RAT measurement procedure is equal to 3 times a second cycle length for the second level of the multi-level discontinuous activity configured for the UE for any cycle length in a predefined set of cycle lengths for the second level of the multi-level discontinuous activity.

* * * * *